US010361427B2

(12) United States Patent
Osaki et al.

(10) Patent No.: US 10,361,427 B2
(45) Date of Patent: Jul. 23, 2019

(54) POSITIVE ELECTRODE ACTIVE MATERIAL, ALL-SOLID-STATE BATTERY AND METHOD FOR PRODUCING ALL-SOLID-STATE BATTERY

(71) Applicant: Toyota Jidosha Kabushiki Kaisha, Toyota-shi, Aichi-ken (JP)

(72) Inventors: Mayuko Osaki, Susono (JP); Yohei Shindo, Susono (JP); Manabu Imano, Hadano (JP); Hideyuki Koga, Numazu (JP); Hidenori Miki, Hiratsuka (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 72 days.

(21) Appl. No.: 15/267,556

(22) Filed: Sep. 16, 2016

(65) Prior Publication Data

US 2017/0084912 A1 Mar. 23, 2017

(30) Foreign Application Priority Data

Sep. 17, 2015 (JP) ................................ 2015-183904
Nov. 30, 2015 (JP) ................................ 2015-234148

(51) Int. Cl.
*H01M 4/131* (2010.01)
*H01M 4/36* (2006.01)
(Continued)

(52) U.S. Cl.
CPC .......... *H01M 4/366* (2013.01); *H01M 4/131* (2013.01); *H01M 4/5815* (2013.01);
(Continued)

(58) Field of Classification Search
CPC .... H01M 4/366; H01M 10/052; H01M 4/131; H01M 10/0585; H01M 4/5825;
(Continued)

(56) References Cited

U.S. PATENT DOCUMENTS

2012/0214064 A1 8/2012 Sabi
2014/0072875 A1* 3/2014 Uchiyama .......... H01M 4/0416 429/231.1
2014/0125291 A1 5/2014 Hama et al.

FOREIGN PATENT DOCUMENTS

CN 103441269 * 12/2013 ............ H01M 4/58
JP 2011108533 A 6/2011
(Continued)

OTHER PUBLICATIONS

Machine translation of CN 103441269, retrieved from <https://worldwide.espacenet.com/?locale=en_EP> on Apr. 21, 2018.*

*Primary Examiner* — Cynthia K Walls
(74) *Attorney, Agent, or Firm* — Dinsmore & Shohl LLP

(57) ABSTRACT

An all-solid-state battery having an olivine-type positive electrode active material and a sulfur solid electrolyte and a method for producing the all-solid-state battery is provided. The positive electrode active material is a positive electrode active material in which primary particles aggregate into secondary particles. The primary particles have an olivine-type positive electrode active material and a coating layer that coats all or a portion of the olivine-type positive electrode active material. The coating layer contains a transition metal derived from the olivine-type positive electrode active material, lithium, phosphorous and oxygen as components thereof, and the concentration of the transition metal is lower the concentration of the olivine-type positive electrode active material. A transition metal-containing sulfide region with a thickness of 10 nm or less and having sulfur and the transition metal derived from the olivine-type positive electrode active material is present on the surface of the secondary particles.

10 Claims, 32 Drawing Sheets

(51) Int. Cl.

| | |
|---|---|
| ***H01M 4/58*** | (2010.01) |
| ***H01M 4/62*** | (2006.01) |
| ***H01M 10/0585*** | (2010.01) |
| ***H01M 10/0562*** | (2010.01) |
| ***H01M 10/052*** | (2010.01) |
| *H01M 4/02* | (2006.01) |

(52) U.S. Cl.

CPC ......... *H01M 4/5825* (2013.01); *H01M 4/625* (2013.01); *H01M 10/052* (2013.01); *H01M 10/0562* (2013.01); *H01M 10/0585* (2013.01); *H01M 2004/028* (2013.01); *H01M 2300/0068* (2013.01)

(58) Field of Classification Search

CPC ............... H01M 4/625; H01M 4/5815; H01M 10/0562; H01M 2300/0068; H01M 2004/028

See application file for complete search history.

(56) References Cited

FOREIGN PATENT DOCUMENTS

| | | | |
|---|---|---|---|
| JP | 2011238523 | A | 11/2011 |
| JP | 2012248414 | A | 12/2012 |
| JP | 2012253975 | A | 12/2012 |
| JP | 2013084499 | A | 5/2013 |
| WO | 2014/073466 | A1 | 5/2014 |

* cited by examiner

POSITIVE ELECTRODE ACTIVE MATERIAL, ALL-SOLID-STATE BATTERY AND METHOD FOR PRODUCING ALL-SOLID-STATE BATTERY

CROSS-REFERENCE TO RELATED APPLICATION

This application claims priority to Japanese Patent Application No. 2015-183904 filed on Sep. 17, 2015, the entire contents of which are hereby incorporated by reference into the present application.

TECHNICAL FIELD

The present disclosure relates to an olivine-type positive electrode active material, an all-solid-state battery having a sulfide solid electrolyte, and a method for producing the same.

BACKGROUND ART

Among the various types of batteries available at present, lithium ion batteries are attracting attention from the viewpoint of their high energy density. Among these batteries, all-solid-state batteries, in which the electrolytic solution has been replaced with a solid electrolyte, are attracting particular attention. This is because, differing from secondary batteries using an electrolytic solution, since all-solid-state batteries do not use an electrolytic solution, there is no degradation of the electrolytic solution caused by overcharging and these batteries have high cycling characteristics and high energy density.

Olivine-type positive electrode active materials are known to be used for the positive electrode active materials used in lithium ion batteries. Olivine-type positive electrode active materials have a more stable structure and higher cycling characteristics in comparison with other positive electrode active materials. Consequently, research has recently been conducted on all-solid-state batteries using olivine-type positive electrode active materials.

Patent Document 1 discloses a positive electrode active material, obtained by coating a type of olivine-type positive electrode active material in the form of $LiFePO_4$ with $Li_3PO_4$, and a method for producing that positive electrode active material.

Patent Document 2 discloses an all-solid-state battery having a polyanionic positive electrode active material such as $LiFePO_4$ and a sulfide solid electrolyte, wherein a sulfide layer containing iron ions is formed at the interface between the positive electrode active material and sulfide solid electrolyte by mixing the $LiFePO_4$ with the sulfide solid electrolyte followed by firing in an attempt to optimize interface bonding.

PRIOR ART DOCUMENTS

Patent Documents

[Patent Document 1] Japanese Unexamined Patent Publication No. 2011-238523

[Patent Document 2] PCT International Publication No. WO 2014/073466

SUMMARY

Problems to be Solved

When an all-solid-state battery that uses an olivine-type positive electrode active material and sulfide solid electrolyte is charged and discharged, there are cases in which the actual battery capacity is less than the theoretical capacity. This is because, when this type of all-solid-state battery is charged, the olivine-type positive electrode active material and sulfide solid electrolyte undergo a chemical reaction, and a resistive layer is formed at the interface between the olivine-type positive electrode active material and sulfide solid electrolyte.

As an example of a method used to solve this problem, a substance such as $Li_3PO_4$ is coated onto the surface of an olivine-type positive electrode active material as described in Patent Document 1. However, in this method, the coating is easily damaged by repeated charging and discharging, thereby preventing the battery from maintaining theoretical capacity.

Thus, an object of the present disclosure is to provide an all-solid-state battery that has an olivine-type positive electrode active material and a sulfur solid electrolyte that demonstrates improved battery capacity, and a method for producing the all-solid-state battery.

Means for Solving the Problems

Means for solving the problems of the present disclosure are as indicated below.

A positive electrode active material, in which primary particles aggregate into secondary particles is provided. The primary particles have an olivine-type positive electrode active material and a coating layer that coats all or a portion of the olivine-type positive electrode active material. The coating layer contains as components thereof a transition metal derived from the olivine-type positive electrode active material, lithium, phosphorous and oxygen, and the concentration of the transition metal is lower than the concentration of the olivine-type positive electrode active material. A transition metal-containing sulfide region having a thickness of 10 nm or less is present on the surface of the secondary particles and the transition metal-containing sulfide region has sulfur and the transition metal derived from the olivine-type positive electrode active material.

The positive electrode active material may include the primary particles having a carbon coating layer between the olivine-type positive electrode active material and the coating layer, and/or a carbon coating layer coating the coating layer.

The positive electrode active material may include the thickness of the coating layer being less than 50 nm.

The positive electrode active material may include the molar ratio of oxygen to phosphorous in the coating layer being 1.89 to 4.66, the molar ratio of sulfur to oxygen 0.24 to 0.64, and the molar ratio of the transition metal to phosphorous being 0.01 to 0.43.

The positive electrode active material may include the coating layer comprising $Li_4P_2O_7$.

The positive electrode active material may include the transition metal-containing sulfide region coating all or a portion of the primary particles.

The positive electrode active material may include the transition metal-containing sulfide region comprising iron sulfide and/or lithium sulfide.

The positive electrode active material may include the olivine-type positive electrode active material being represented by the chemical formula $Li_xM_yPO_z$ wherein, M represents Fe, Mn, Co and Ni, x is such that $0.5 \leq x \leq 1.5$, y is such that $0.5 \leq y \leq 1.5$ and z is such that $2 \leq z \leq 7$.

The positive electrode active material may include the olivine-type positive electrode active material being $LiFePO_4$.

An all-solid-state battery having a sulfide solid electrolyte and the positive electrode active material as described above may be provided.

A method for producing an all-solid-state battery having a positive electrode active material layer, a solid electrolyte layer and a negative electrode active material layer in that order is provided. The positive electrode active material layer has a positive electrode active material in the form of an olivine-type positive electrode active material, and the method comprises carrying out charge-discharge cycling in which the all-solid-state battery is maintained at 25° C. to 80° C. and discharged until the electrical potential of the positive electrode active material layer becomes 2.1 V vs. $Li/Li^+$ or lower.

The method for producing an all-solid-state battery may include the all-solid-state battery being discharged until the electrical potential of the positive electrode active material layer becomes 1.6 V vs. $Li/Li^+$ to 2.1 V vs. $Li/Li^+$ during the charge-discharge cycling.

The production method may include the charge-discharge cycling being carried out at a charge-discharge rate of 1.0 C or less.

The production method may include the all-solid-state battery being charged until the electrical potential of the positive electrode active material layer becomes 3.8 V vs. $Li/Li^+$ to 4.4 V vs. $Li/Li^+$ during the charge-discharge cycling.

The production method may include the charge-discharge cycling being repeated until the discharge capacity of the all-solid-state battery becomes greater than the discharge capacity in the initial charge-discharge cycle.

The production method may include the charge-discharge cycling being carried out until a discharge plateau of the electrical potential of the positive electrode active material during discharge is no longer observed at 2.1 V vs. $Li/Li^+$ to 2.5 V vs. $Li/Li^+$.

The production method may include the charge-discharge cycling being carried out until a discharge plateau of the electrical potential of the positive electrode active material during discharge appears at 3.3 V vs. $Li/Li^+$ to 3.5 V vs. $Li/Li^+$.

The production method may include the charge-discharge cycling being carried out continuously.

The production method may include the charge-discharge cycling being carried out starting from the initial charge-discharge.

The production method may include carrying out the charge-discharge cycling for at least 3 times followed by warming the all-solid-state battery to 40° C. to 80° C. for 40 hours or more.

The production method may include the olivine-type positive electrode active material being represented by the chemical formula $Li_xM_yPO_z$ wherein, M represents Fe, Mn, Co and Ni, x is such that $0.5 \le x \le 1.5$, y is such that $0.5 \le y \le 1.5$ and z is such that $2 \le z \le 7$.

The production method may include the olivine-type positive electrode active material being $LiFePO_4$.

Effects of the Invention

According to the present disclosure, an all-solid-state battery, which has an olivine-type positive electrode active material and sulfide solid electrolyte and demonstrates improved battery capacity, and a method for producing that all-solid-state battery, can be provided.

BRIEF DESCRIPTION OF THE DRAWINGS

FIG. 1(*b*) is a schematic cross-sectional views of the positive electrode active material according to one or more embodiments disclosed and described herein.

FIG. 6(*b*) is a schematic representation of mechanisms in which the positive electrode active material is formed according to one or more embodiments disclosed and described herein.

FIG. 8(*b*) is a high-angle annular dark-field imaging (HAADF) of the olivine-type positive electrode active material portion, coating layer portion and sulfide solid electrolyte according to one or more embodiments disclosed and described herein.

FIG. 9(*b*) is a diffraction image of the coating layer portion of the positive electrode active material according to one or more embodiments disclosed and described herein.

FIG. 10(*b*) is an HAADF image of the area around the interface between the positive electrode active material and sulfide solid electrolyte according to one or more embodiments disclosed and described herein.

FIG. 12(*b*) is a TEM image of a positive electrode active material of an all-solid-state battery having an olivine-type positive electrode active material and a sulfide solid electrolyte which has been discharged by a conventional method.

DETAILED DESCRIPTION OF THE INVENTION

The following provides a detailed description of embodiments of the present disclosure. Furthermore, the present disclosure is not limited to the following embodiments, but rather can be modified in various ways within the scope of the gist thereof.

<<Positive Electrode Active Material of the Present Disclosure>>

The positive electrode active material of the present disclosure is a positive electrode active material in which primary particles aggregate into secondary particles. Here, the primary particles have an olivine-type positive electrode active material and a coating layer that coats all or a portion of the olivine-type positive electrode active material. This coating layer contains as components thereof a transition metal derived from the olivine-type positive electrode active material, lithium, phosphorous and oxygen, and the concentration of the transition metal is lower than the concentration of the olivine-type positive electrode active material. In addition, a transition metal-containing sulfide region having a thickness of 10 nm or less is present on the surface of the secondary particles, this transition metal-containing sulfide region having sulfur and the transition metal derived from the olivine-type positive electrode active material.

Although Fe is used as an example of a transition metal in the following explanation, transition metals able to be used in the present disclosure are not limited to Fe.

Figure 1A:
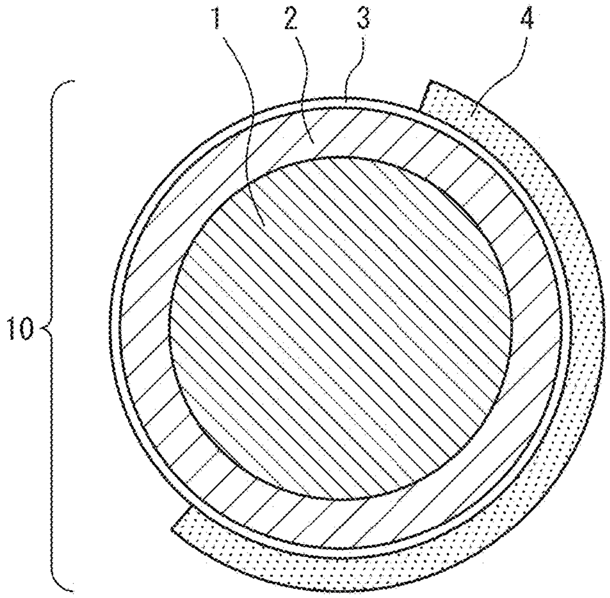
FIG. 1(*a*) is a schematic cross-sectional view of the positive electrode active material according to one or more embodiments disclosed and described herein.
Figure 1B:
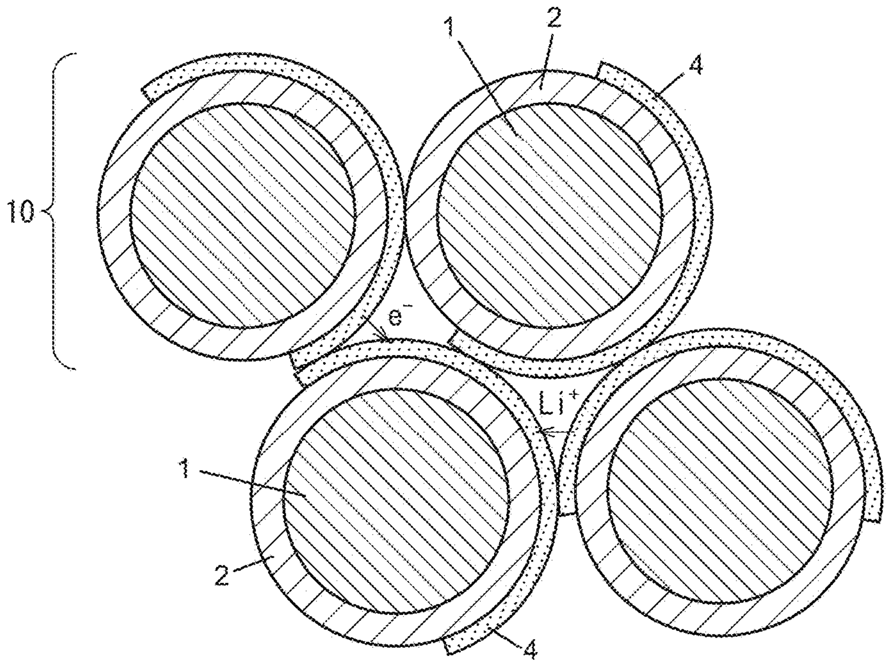

FIG. 1(*a*) is a schematic cross-sectional view of a primary particle of the positive electrode active material of the present disclosure. In FIG. 1(*a*), a primary particle (10) of the positive electrode active material of the present disclosure has an olivine-type positive electrode active material (1) and a coating layer (2) coating the olivine-type positive electrode active material (1). Moreover, the primary particle (10) also has a transition metal-containing sulfide region (4) coating a portion of this coating layer (2).

In addition, FIG. 1(*b*) is a schematic cross-sectional view of a portion of a secondary particle of the positive electrode active material of the present disclosure. In FIG. 1(*b*), the transition metal-containing sulfide region (4) of a primary particle (10) of the positive electrode active material present within the secondary particle of the positive electrode active material of the present disclosure contacts other primary particles of the positive electrode active material.

Incidentally, FIGS. 1(*a*) and 1(*b*) merely indicate one embodiment of the present disclosure and are not intended to limit the present disclosure. For example, although the transition metal-containing sulfide region (4) coats a portion of the primary particles in FIGS. 1(*a*) and 1(*b*), the transition metal-containing sulfide region (4) in the present disclosure is not required to coat the primary particles and is not required to be present between the primary particles. In addition, although the coating layer is coated by a carbon coating layer (3), this carbon coating layer (3) is not an essential constituent of the positive electrode active material of the present disclosure.

The operating principle of the present disclosure is thought to be as indicated below, although the present disclosure is not limited by that principle.

When an all-solid-state battery that uses an olivine-type positive electrode active material and sulfide solid electrolyte is charged, there are cases in which the actual capacity of the positive electrode active material of the battery is considerably lower than the theoretical capacity of the positive electrode active material. This is because the olivine-type positive electrode active material and sulfide solid electrolyte undergo a chemical reaction during charging of the battery, and a resistive layer having low lithium ion conductivity is formed at the interface between the olivine-type positive electrode active material and sulfide solid electrolyte.

Figure 2:
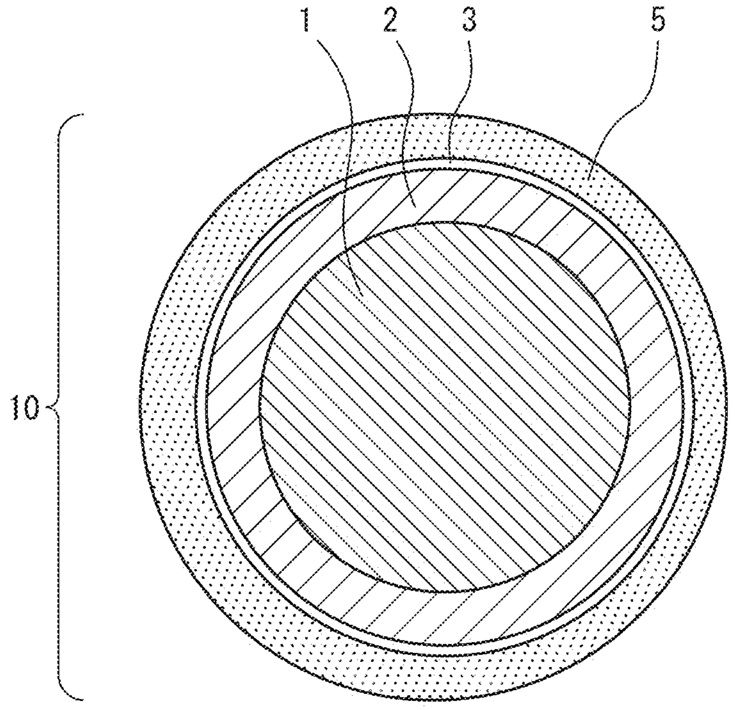
FIG. 2 is a schematic cross-sectional view of a positive electrode active material which has been obtained by charging and discharging an all-solid-state battery having an olivine-type positive electrode active material and a sulfide solid electrolyte by a conventional method.

FIG. 2 is a schematic cross-sectional view representing the state of a primary particle of an olivine-type positive electrode active material of an all-solid-state battery, the battery uses an olivine-type positive electrode active material and a sulfide solid electrolyte, having been charged and discharged by a conventional method, or in other words, charging and discharging without allowing the discharge potential of the positive electrode active material layer to decrease to 2.1 V or lower (vs. $Li/Li^+$). As shown in FIG. 2, when an all-solid-state battery is charged in this manner, a transition element, which is a constituent of the olivine-type positive electrode active material (1), and sulfur, which is a constituent of the sulfur solid electrolyte, react in the vicinity of the surface of the primary particle of the olivine-type positive electrode active material, resulting in the formation of a resistive layer (5) on the surface of the primary particle. At the same time, the coating layer (2) is formed in the vicinity of the surface of the primary particle of the olivine-type positive electrode active material. Incidentally, the primary particle of the olivine-type positive electrode active material of FIG. 2 has the carbon coating layer (3). However, it should be understood that this carbon coating layer (3) is not an essential constituent of the positive electrode active material of the present disclosure.

Figure 3:
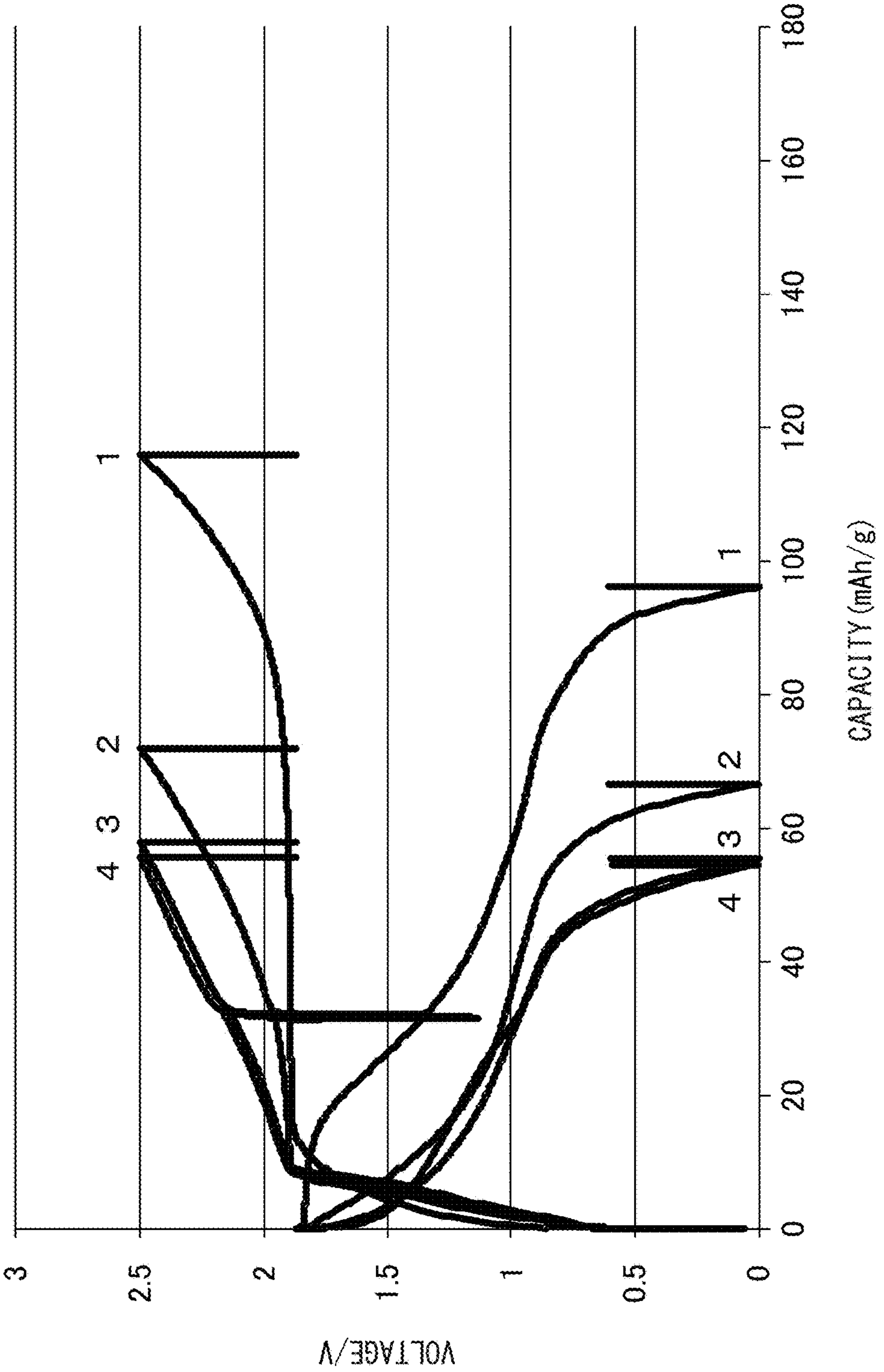
FIG. 3 is a graph showing the relationship between voltage and battery capacity of an all-solid-state battery having an olivine-type positive electrode active material and a sulfide solid electrolyte which has been charged and discharged by a conventional method.

FIG. 3 is a graph representing the relationship between battery capacity and voltage of an all-solid-state battery, the battery using a type of olivine-type positive electrode active material in the form of $LiFePO_4$ and a sulfide solid electrolyte, having been charged and discharged repeatedly by a conventional method, or in other words, charged and discharged repeatedly without allowing the discharge potential of the positive electrode active material layer to decrease to 2.1 V or lower (vs. $Li/Li^+$). In contrast to the theoretical capacity of $LiFePO_4$ being about 170 mAh/g, in the all-solid-state battery using $LiFePO_4$ and a sulfide solid electrolyte, the battery only has a capacity that is considerably lower than the theoretical capacity during the initial stage of charging and discharging, and capacity decreases further as charge-discharge cycling is repeated.

Figure 4:
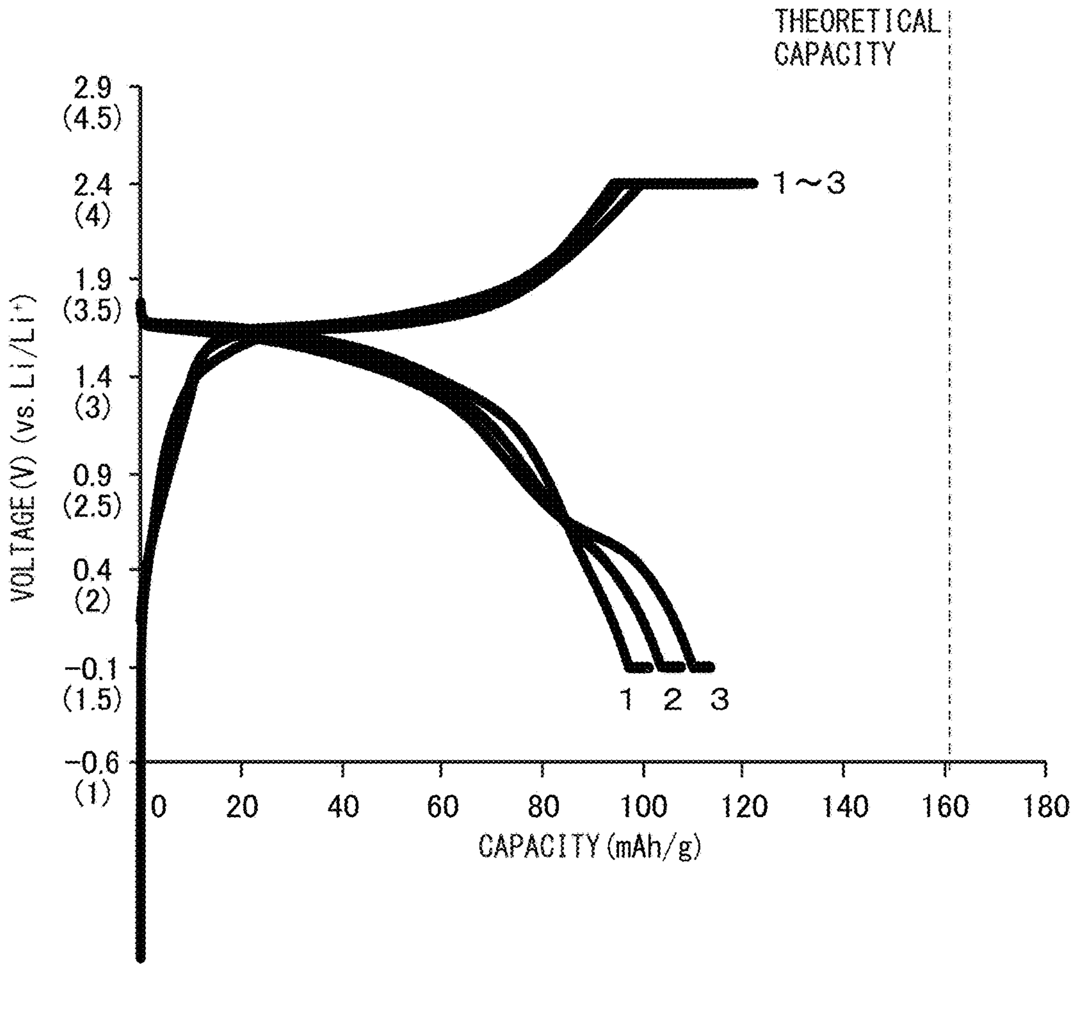
FIG. 4 is a graph showing the relationship between voltage and battery capacity of an all-solid-state battery having a positive electrode active material and a sulfide solid electrolyte, the positive electrode active material having been obtained by coating $Li_3PO_4$ onto an olivine-type positive electrode active material, and the battery having been charged and discharged by a conventional method.

FIG. 4 is a graph representing the relationship between battery capacity and voltage of an all-solid-state battery, the battery has a positive electrode active material, obtained by coating $LiFePO_4$ with $Li_3PO_4$, and a sulfide solid electrolyte, having been charged and discharged repeatedly. As shown in the drawing, in an all-solid-state battery that uses a positive electrode active material, obtained by coating $LiFePO_4$ with $Li_3PO_4$, and a sulfide solid electrolyte, differing from the case of not coating the $LiFePO_4$, battery capacity does not decrease even if charge-discharge cycling is repeated.

However, as shown in the drawing, battery capacity is much lower in comparison with the theoretical capacity of $LiFePO_4$.

In other words, in an all-solid-state battery that uses a positive electrode active material obtained by coating $LiFePO_4$ with $Li_3PO_4$ and a sulfide solid electrolyte in the manner of Patent Document 1, although a decrease in capacity caused by repeating charge-discharge cycling can be inhibited, the battery capacity is lower than the theoretical capacity of $LiFePO_4$.

In addition, the discharge plateau in the vicinity of 3.3 V (vs. $Li/Li^+$) to 3.5 V (vs. $Li/Li^+$), which indicates that the $LiFePO_4$ and lithium ions are reacting, is no longer observed as the number of charge-discharge cycles increases, while a discharge plateau in the vicinity of 2.1 V (vs. $Li/Li^+$) to 2.5 V (vs. $Li/Li^+$), which indicates that the resistive layer and lithium ions are reacting, begins to appear. This is presumed to be due to destruction of $Li_3PO_4$ coating caused by repeated charging and discharging, thereby resulting in the formation of a resistive layer at the interface between the positive electrode active material and the sulfide solid electrolyte.

In this manner, in an all-solid-state battery that uses a positive electrode active material obtained by coating $LiFePO_4$ with $Li_3PO_4$ and a sulfide solid electrolyte, capacity corresponding to the theoretical capacity is unable to be obtained, and since the $Li_3PO_4$ coating is easily damaged, a resistive layer is formed at the interface between the olivine-type positive electrode active material and the sulfide solid electrolyte as the number of charge-discharge cycles increases.

Consequently, the cycling characteristics of such an all-solid-state battery are not high.

In contrast, an all-solid-state battery that uses the positive electrode active material according to one more embodiments disclosed and discussed herein and a sulfide solid electrolyte has capacity that approximates the theoretical capacity of the olivine-type positive electrode active material, and has high cycling characteristics.

Since primary particles of the positive electrode active material according to one more embodiments disclosed and discussed herein have a coating layer that exhibits low reactivity with the sulfide solid electrolyte, the formation of a passive coating on the surface of the positive electrode active material layer can be inhibited. Consequently, the formation of a resistive layer at the interface between the olivine-type positive electrode active material and sulfide solid electrolyte during charging of the battery can be inhibited. In addition, this coating layer contains a transition metal derived from the olivine-type positive electrode active material, lithium, phosphorous and oxygen as components thereof, and differing from other protective coatings in the manner of a coating such as $Li_3PO_4$, the interface with the olivine-type positive electrode active material is favorable and resistant to damage.

In addition, a transition metal-containing sulfide region is present on the surface of secondary particles of the positive electrode active material of the present disclosure. Moreover, as shown in FIG. 1(*a*), for example, the transition metal-containing sulfide region (4) may coat all or a portion of the surface of the primary particles, and as shown in FIG. 1(*b*), the transition metal-containing sulfide region (4) coating a portion of primary particles of the positive electrode active material may contact other primary particles of the positive electrode active material within the secondary particles.

This transition metal-containing sulfide region has high electron conductivity and functions as an electron conduction path. Moreover, the lithium ion conductivity of this transition metal-containing sulfide region is higher than that of the olivine-type positive electrode active material, enabling it to also function as a lithium ion conduction path.

Since the positive electrode active material according to one more embodiments disclosed and discussed herein has the structure described above, it allows obtaining a capacity that is equal to the theoretical capacity of the olivine-type positive electrode active material.

Figure 5:
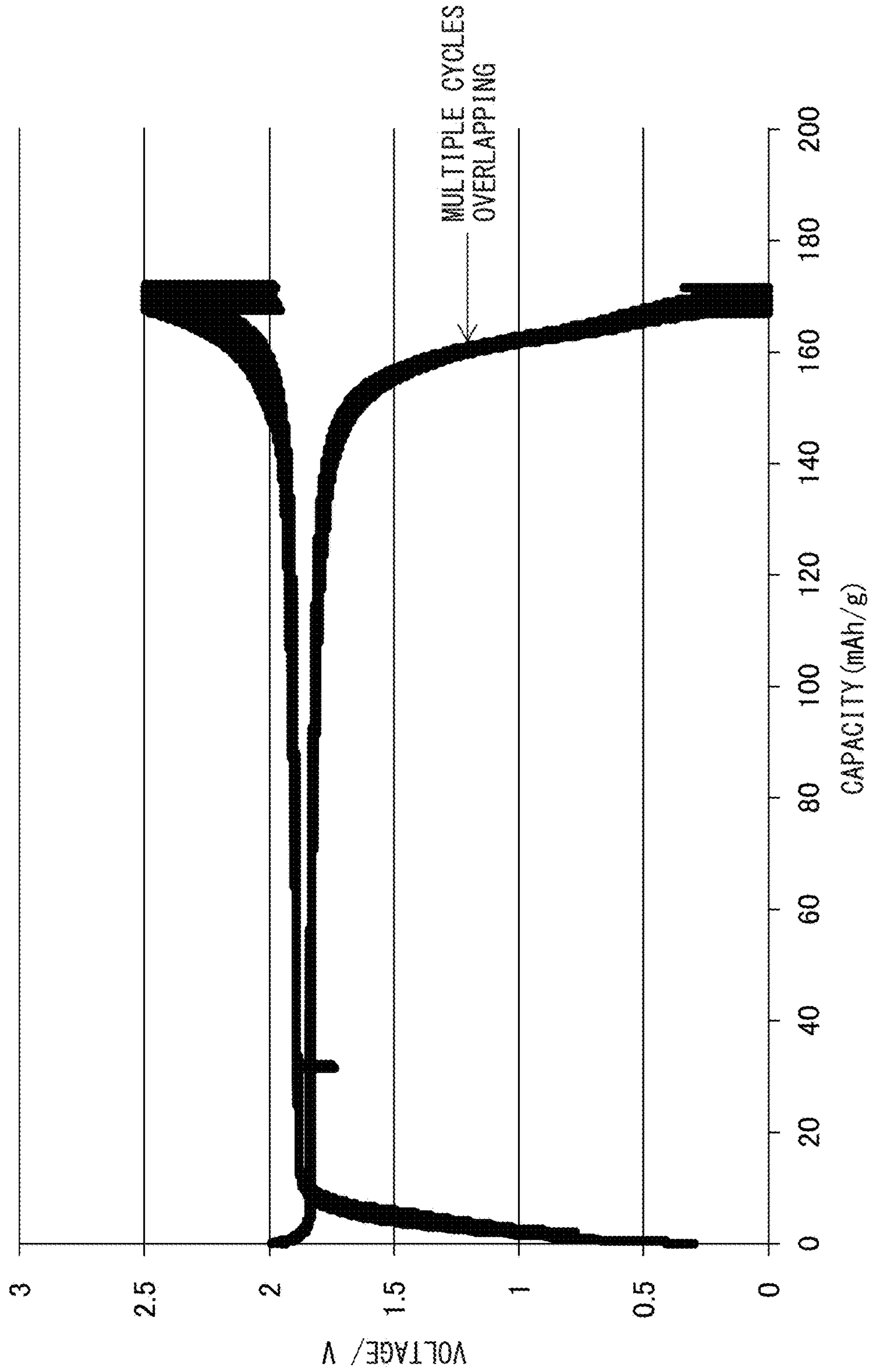
FIG. 5 is a graph showing the relationship between voltage and battery capacity of the all-solid-state battery having a positive electrode active material and a sulfide solid electrolyte which has been charged and discharged by a method according to one or more embodiments disclosed and described herein.

FIG. 5 is a graph representing the relationship between battery capacity and voltage of an all-solid-state battery having been charged and discharged repeatedly. The battery has the positive electrode active material according to one more embodiments disclosed and discussed herein which has been produced by using $LiFePO_4$ as a positive electrode active material, and a sulfide solid electrolyte. As shown in the drawing, in an all-solid-state battery that uses the positive electrode active material according to one more embodiments disclosed and discussed herein and a sulfide solid electrolyte, capacity is about 170 mAh/g, and capacity is obtained that is equal to the theoretical capacity of $LiFePO_4$. In addition, there is hardly any change in the curve representing the relationship between capacity and voltage even if charge-discharge cycling is repeated.

<Positive Electrode Active Material>

The positive electrode active material of the present disclosure consists of secondary particles obtained by aggregation of primary particles. The primary particles have an olivine-type positive electrode active material and a coating layer that coats all or a portion of the olivine-type positive electrode active material. In addition, the primary particles may have a carbon coating layer present between the olivine-type positive electrode active material and coating layer, or may have a carbon coating layer coating the coating layer.

<Olivine-Type Positive Electrode Active Material>

There are no particular limitations on the olivine-type positive electrode active material provided so long as it is a substance that has an olivine structure and is a positive electrode active material that can be used in a lithium ion battery. An example of the olivine-type positive electrode active material is an active material represented by, for example, the chemical formula $Li_xM_yPO_z$ (wherein, M represents Fe, Mn, Co and Ni, x is such that $0.5 \leq x \leq 1.5$, y is such that $0.5 \leq y \leq 1.5$ and z is such that $2 \leq z \leq 7$). In particular, $LiFePO_4$ is preferable for the olivine-type positive electrode active material since it has high material stability and has a large theoretical capacity.

<Coating Layer>

The coating layer contains a transition metal derived from the olivine-type positive electrode active material, lithium, phosphorous and oxygen as components thereof. In addition, the transition metal concentration of the coating material is lower than that of the olivine-type positive electrode active material.

The coating layer is only required to contain a transition metal derived from the olivine-type positive electrode active material, lithium, phosphorous and oxygen as components thereof, and there are no restrictions on the crystal structure thereof. For example, the lithium, phosphorous and oxygen in the coating layer can have the structure of $Li_4P_2O_7$. In addition, the coating layer may also contain sulfur.

The thickness of the coating layer may be 1 nm to 100 nm, 90 nm or less, 60 nm or less, 30 nm or less, 15 nm or less, 10 nm or less or 5 nm or less. In addition, the thickness of the coating layer is preferably less than 50 nm. This is because, if the coating layer is excessively thick, internal resistance of the battery becomes large due to resistance of the coating layer, thereby decreasing the capacity of the battery.

There are no particular limitations on the composition ratio of each component in the coating layer with the exception of the transition metal concentration thereof being lower than that of the olivine-type positive electrode active material.

The molar ratio of oxygen to phosphorous may be 1.00 or more, 1.50 or more, 2.0 or more, 2.50 or more or 3.00 or more, and 5.00 or less, 4.50 or less, 4.00 or less or 3.50 or less.

The molar ratio of sulfur to oxygen may be 0.24 to 0.64, 0.2 or more, 0.25 or more, 0.30 or more or 0.35 or more, and 0.70 or less, 0.65 or less, 0.60 or less, 0.55 or less, 0.50 or less, 0.45 or less or 0.40 or less.

The molar ratio of transition metal to phosphorous may be 0.50 or less, 0.45 or less, 0.40 or less or 0.30 or less and 0.01 or more, 0.05 or more, 0.10 or more, 0.15 or more, 0.20 or more or 0.25 or more.

In addition, the molar ratio of oxygen to phosphorous is preferably 1.89 to 4.66, the molar ratio of sulfur to oxygen is preferably 0.24 to 0.64, and the molar ratio of the transition metal to phosphorous is preferably 0.01 to 0.43. This is because, although a smaller amount of transition metal in the coating layer results in lower reactivity between the coating layer and sulfide solid electrolyte, the presence of transition metal in the coating layer results in favorable adhesion between the coating layer and olivine-type positive electrode active material.

<Transition Metal-Containing Sulfide Region>

The transition metal-containing sulfide region is present on the surface of secondary particles in the positive electrode active material of the present disclosure. The thickness of the transition metal-containing sulfide region is 10 nm or less, and the transition metal-containing sulfide region has sulfur and transition metal derived from the olivine-type positive electrode active material.

In addition, the transition metal-containing sulfide region may also be a transition metal sulfide and/or lithium sulfide. Furthermore, this transition metal sulfide is a sulfide of a transition metal derived from the olivine-type positive electrode active material.

This transition metal-containing sulfide region functions as an electron conduction path since it has high electron conductivity. Moreover, since this transition metal-containing sulfide region has higher lithium ion conductivity than the olivine-type positive electrode active material, it also has the function of a lithium ion conduction path by which lithium ions are conducted from the sulfide solid electrolyte to the secondary particles during charging and discharging of the all-solid-state battery.

In addition, this transition metal-containing sulfide region may coat all or a portion of the coating layer of primary particles, and may also be present between the primary particles. As a result, the interface between the transition metal-containing sulfide region and the primary particles is favorable, and electron conductivity and lithium ion conductivity increase.

The thickness of the transition metal-containing sulfide region may be 10 nm or less, 9 nm or less, 8 nm or less, 7 nm or less, 6 nm or less, 5 nm or less, 4 nm or less, 3 nm or less, 2 nm or less or 1 nm or less.

<All-Solid-State Battery>

The all-solid-state battery of the present disclosure has a sulfide solid electrolyte and the positive electrode active material of the present disclosure. More specifically, the all-solid-state battery of the present disclosure has a positive electrode current collector, a positive electrode active material layer, a solid electrolyte layer, a negative electrode active material layer and a negative electrode current collector, and this positive electrode active material has the positive electrode active material of the present disclosure. The sulfide solid electrolyte may or may not be included in the positive electrode active material layer. In the case the sulfide solid electrolyte is not included in the positive electrode active material layer, the sulfide solid electrolyte is present in the solid electrolyte layer.

Furthermore, the all-solid-state battery of the present disclosure can be fabricated by, for example, the production method of the present disclosure to be subsequently described. However, the following description of the production method of the present disclosure is merely one example of the method for producing an all-solid-state battery of the present disclosure, and is not intended to exclude batteries produced by other methods.

1. Positive Electrode Current Collector

There are no particular limitations on the raw materials of the positive electrode current collector, and various types of metals such as silver, copper, gold, aluminum, nickel, iron, stainless steel or titanium, as well as alloys thereof, can be used. An aluminum current collector is preferably used for the positive electrode current collector from the viewpoint of chemical stability.

2. Positive Electrode Active Material Layer

The positive electrode active material layer contains a positive electrode active material and optionally contains a sulfide solid electrolyte, a conductive assistant and a binder.

(a) Positive Electrode Active Material

The previously described positive electrode active material of the present disclosure is used for the positive electrode active material. In addition, other positive electrode active materials may be additionally contained. Other positive electrode active materials may be any positive electrode active materials used in lithium ion batteries, and there are no particular limitations thereon.

(b) Sulfide Solid Electrolyte

A sulfide solid electrolyte used as a solid electrolyte of all-solid-state batteries can be used for the solid electrolyte. Examples thereof include $Li_2S—SiS_2$, $LiX—Li_2S—SiS_2$, $LiX—Li_2S—P_2S_5$, $LiX—Li_2S—P_2S_5$, $LiX—Li_2S—Li_2O—P_2S_5$ and $Li_2S—P_2S_5$. Furthermore, "X" represents I and/or Br.

(c) Conductive Assistant

Examples of conductive assistants include carbon materials such as vapor-grown carbon fibers (VGCF), acetylene black, Ketjen black or carbon nanotubes (CNT), metals such as nickel, aluminum, stainless steel, and combinations thereof.

(d) Binder

Examples of binders include, but are not limited to, polymer resins such as polyvinylidene fluoride (PVDF), polytetrafluoroethylene (PTFE), polyimide (PI), polyamide (PA), polyamide-imide (PAI), butadiene rubber (BR), styrene butadiene rubber (SBR), nitrile butadiene rubber (NBR), styrene-ethylene-butylene-styrene block copolymer (SEBS), carboxymethyl cellulose (CMC) and combinations thereof.

3. Solid Electrolyte Layer

The solid electrolyte layer has a solid electrolyte and optionally has a binder. The same solid electrolytes and binders described with respect to the positive electrode active material layer can be used for the solid electrolyte and binder. Furthermore, when using a sulfide solid electrolyte in the positive electrode active material layer, a solid electrolyte other than a sulfide solid electrolyte may be used.

4. Negative Electrode Active Material Layer

The negative electrode active material layer has a negative electrode active material and optionally has a solid electrolyte, conductive assistant and binder.

There are no particular limitations on the negative electrode active material used in the negative electrode active material layer provided it is able to occlude and release lithium ions. Specific examples of negative electrode active materials include metals such as Li, Sn, Si or In, alloys of lithium and Ti, Mg or Al, carbon materials such as hard carbon, soft carbon or graphite, and combinations thereof. Lithium titanate (LTO) and lithium-containing alloys are preferable from the viewpoints of cycling characteristics and discharge characteristics.

The same solid electrolytes, conductive assistants and binders described with respect to the positive electrode active material layer can be used for the solid electrolyte, conductive assistant and binder.

5. Negative Electrode Current Collector

There are no particular limitations on the raw materials of the negative electrode current collector, and various types of current collectors made of metals such as silver, copper, gold, aluminum, nickel, iron, stainless steel or titanium, or alloys thereof, can be used. A copper current collector is preferably used for the negative electrode current collector from the viewpoint of chemical stability.

<<Production Method of Present Disclosure>>

The production method of the present disclosure for producing an all-solid-state battery comprises laminating a positive electrode active material layer, solid electrolyte layer and negative electrode active material layer in that order followed by assembling into an all-solid-state battery. Here, the positive electrode active material layer has an olivine-type positive electrode active material for the positive electrode active material. In addition, this method of the present disclosure also comprises carrying out charge-discharge cycling in which the all-solid-state battery is maintained at 25° C. to 80° C. and discharged until the electrical potential of the positive electrode active material layer becomes 2.1 V or lower (vs. $Li/Li^+$).

Although not limited thereto, the operating principle of the present disclosure is thought to be as indicated below.

When an all-solid-state battery that uses an olivine-type positive electrode active material and a sulfide solid electrolyte undergoes ordinary charging and discharging, a capacity can only be obtained that is much lower than the theoretical capacity of the positive electrode active material. This is because, during charging of the battery, a reaction between a transition metal which is a constituent of the olivine-type positive electrode active material and the sulfur present in the sulfide solid electrolyte occurs at the interface between the olivine-type positive electrode active material and the sulfide solid, and this results in the formation of a sulfide resistive layer having low lithium ion conductivity and electron conductivity.

Simultaneous to the formation of this resistive layer, the constituent element of the olivine-type positive electrode active material in the form of a transition metal is eliminated therefrom on the inside of this resistive layer, namely at the interface between this resistive layer and the olivine-type positive electrode active material, resulting in the formation of a coating layer. This coating layer is a stable phosphate layer that contains little transition metal and exhibits little reactivity with the sulfide solid electrolyte. Consequently, this coating layer has the function of a protective layer that inhibits the olivine-type positive electrode active material from reacting with the sulfide solid electrolyte during charging and discharging of the battery.

Thus, if it were possible to remove the resistive layer formed by charging and discharging an all-solid-state battery that uses an olivine-type positive electrode active material and sulfide solid electrolyte, it would be possible to fabricate a sulfide solid-state battery that has the theoretical capacity of the olivine-type positive electrode active material and demonstrates high cycling characteristics.

The inventors of the present disclosure found that this resistive layer can be removed by repeatedly subjecting an all-solid-state battery using an olivine-type positive electrode active material and sulfide solid electrolyte to charge-discharge cycling under certain conditions.

Figure 6A:
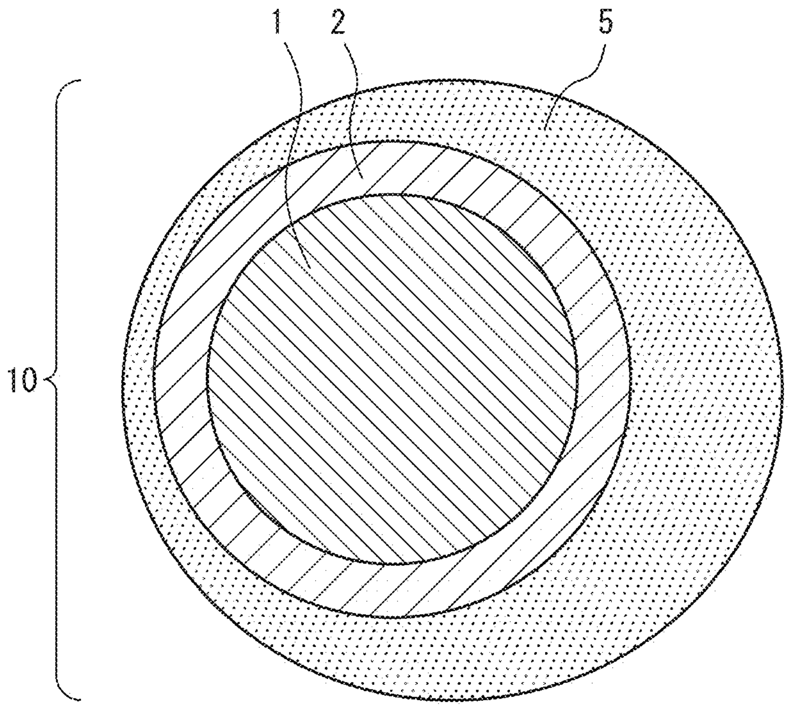
FIG. 6(*a*) is a schematic representation of mechanisms in which the positive electrode active material is formed according to one or more embodiments disclosed and described herein.
Figure 6B:
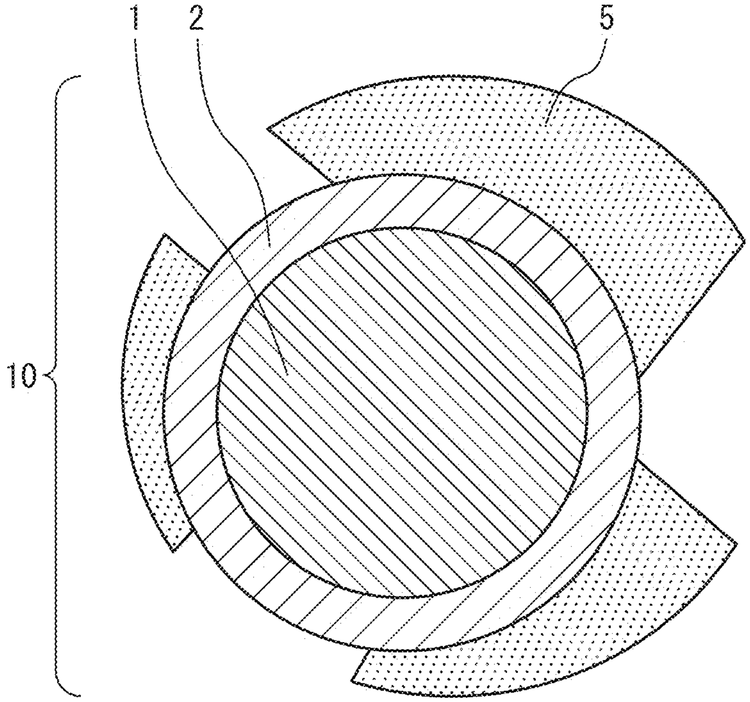

The mechanism by which this resistive layer is removed is thought to be as indicated below. First, as shown in FIG. 6(*a*), when an all-solid-state battery using an olivine-type positive electrode active material (1) and sulfide solid electrolyte is charged, a resistive layer (5) is formed at the interface between the sulfide solid electrolyte and the olivine-type positive electrode active material (1) of a primary particle (10) of the positive electrode active material. In addition, a coating layer (2) is simultaneously formed between the resistive layer (5) and the olivine-type positive electrode active material (1). In the case $LiFePO_4$ and a sulfide solid electrolyte are used, this reaction is thought to proceed in the manner of the reaction formula indicated below.

$$FePO_4+Li_3PS_4 \rightarrow FeS_2 \text{ (resistive layer)}+Li_4P_2O_7 \text{ (coating layer)}+Li+e^-$$

It is believed that due to this reaction, a resistive layer (5) having $FeS_2$ and a coating layer (2) comprising $Li_4P_2O_7$ are formed. In addition, this formation occurs during the charging of a first cycle or first several cycles of charge-discharge cycling.

Subsequently in the method of the present disclosure, a reaction occurs between transition metal sulfide that composes this resistive layer and lithium ions during the early discharge cycles. This reaction is thought to consist of two types of reactions. The first reaction is a reaction in which lithium ions are inserted into the transition metal sulfide resulting in the formation of $Li_xFeS_x$. This reaction occurs in the vicinity of about 2.5 V (vs. $Li/Li^+$). The other reaction is a reaction (conversion reaction) in which transition metal present in the transition metal sulfide is replaced with lithium resulting in the formation of $Li_2S$. This reaction occurs in the vicinity of about 2.1 V (vs. $Li/Li^+$). These reactions are thought to proceed in the manner of the reaction formulas indicated below.

$$FeS_x+xLi^++xe^- \rightarrow Li_xFeS_x$$

$$FeS_x+2xLi^++2xe^- \rightarrow Li_2S+Fe$$

As shown in FIG. 6(*b*), in the method of the present disclosure, when charge-discharge cycling is subsequently further repeated, the conversion reaction by which transition metal present in the transition metal sulfide is replaced with lithium during discharge continues to proceed. In addition, transition metal alone or compounds thereof formed by this reaction during discharge become ionized, and as a result of the diffusion of these ions, the resistive layer (5) composed of transition metal sulfide is destroyed. These reactions are thought to proceed in the manner of the reaction formulas indicated below.

$$Fe \rightarrow Fe^{x+}+xe^- \text{(during charging)}$$

$$FeS_x+2xLi^++2xe^- \rightarrow Li_2S+Fe \text{ (during discharge)}$$

Figure 7:
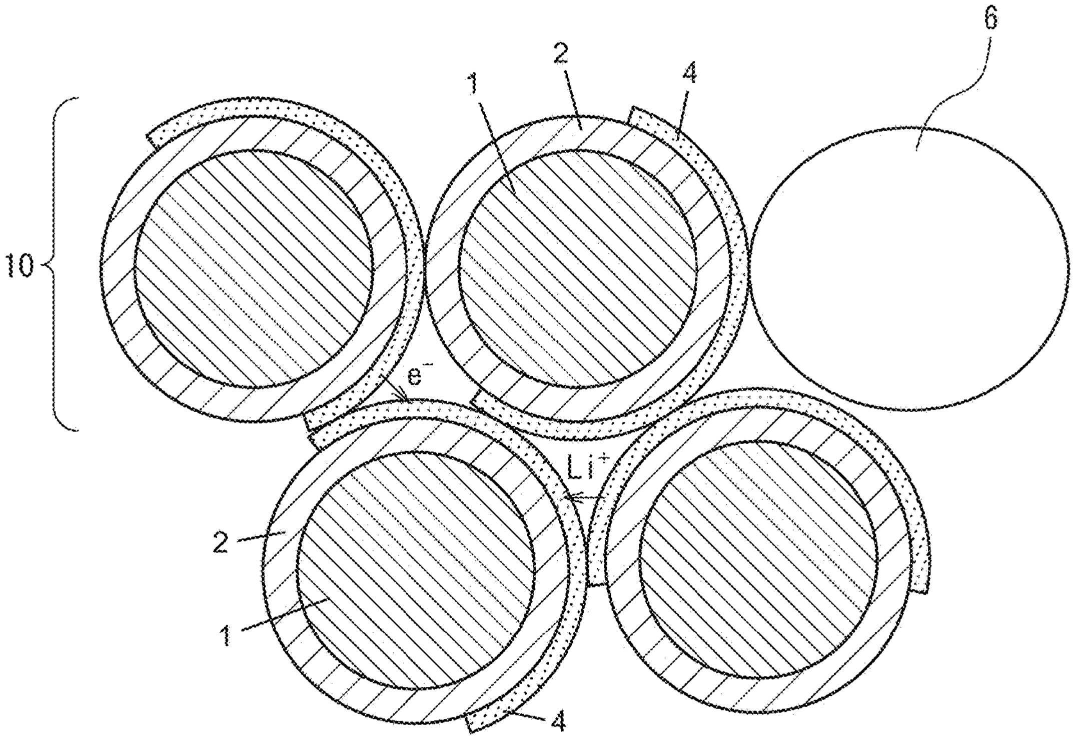
FIG. 7 is a schematic representation of a portion of a secondary particle of the positive electrode active material according to one or more embodiments disclosed and described herein.

As a result, the resistive layer (5) present at the interface between the olivine-type positive electrode active material (1) and sulfide solid electrolyte (6) is removed. At the same time, as shown in FIG. 7, the $Li_2S$ formed during discharge diffuses into secondary particles of the positive electrode active material, and this is thought to result in the formation of lithium ion conduction paths within the secondary particles.

As a result of discharging to an electrical potential lower than the electrical potential of about 2.1 V (vs. $Li/Li^+$) at which this reaction occurs in the positive electrode active material layer, the conversion reaction by which transition metal in the transition metal sulfide is replaced with lithium is able to proceed efficiently. Consequently, by carrying out charge-discharge cycling in which discharging proceeds until the electrical potential of the positive electrode active material layer reaches about 2.1 V or lower (vs. $Li/Li^+$), the resistive layer can be removed and a sulfide solid-state battery can be fabricated that has the theoretical capacity of the olivine-type positive electrode active material and demonstrates high cycling characteristics.

In addition, by repeating charge-discharge cycling while controlling not only the lower limit of the electrical potential of the positive electrode active material layer during charging (to referred to as the "lower limit discharge potential"), but also the upper limit of the electrical potential of the positive electrode active material layer during charging (to be referred to as the "upper limit charging potential"), the charge-discharge rate and/or the temperature of the battery to certain conditions, a sulfide solid-state battery can be fabricated more efficiently that has battery capacity that is closer to the theoretical capacity.

During charging of the battery, the reaction by which the resistive layer is formed occurs more frequently the higher the electrical potential. If the resistive layer becomes large, it cannot be removed unless subsequent charge-discharge cycling is repeated numerous times. In addition, at a high upper limit charging potential, other side reactions occur causing the internal resistance of the all-solid-state battery to become large following completion thereof. Thus, it is preferable to suppress these side reactions by maintaining the upper limit charging potential to a certain potential or lower.

In addition, when the charge-discharge rate has been lowered, the voltage at which the conversion reaction occurs is maintained for a longer time period and the conversion reaction replaces the transition metal in the transition metal sulfide with lithium. As a result, the number of reactions that occur due to a single charge-discharge cycle can be increased. Consequently, the number of charge-discharge cycles required to remove the resistive layer can be reduced by lowering the charge-discharge rate.

In addition, the conversion reaction by which transition metal in the transition metal sulfide is replaced with lithium proceeds with difficulty in the case the temperature is excessively low. Conversely, although the reaction per se proceeds more rapidly in the case the temperature is excessively high, the positive electrode active material deteriorates due to the occurrence of other side reactions. Consequently, it is preferable for the temperature to be within a prescribed range during charge-discharge cycling.

<All-Solid-State Battery>

The production method of the present disclosure is a method for producing an all-solid-state battery having a positive electrode active material layer, a solid electrolyte layer and a negative electrode active material layer in that order. Here, the positive electrode active material layer has an olivine-type positive electrode material for the positive electrode active material. The same olivine-type positive electrode active materials described with respect to the positive electrode active material of the present disclosure can be used for the olivine-type positive electrode active material.

Furthermore, there are no particular limitations on the methods used to fabricate the positive electrode active material layer, sulfide solid electrolyte layer and negative electrode active material layer, and these layers can be fabricated according to any method known among persons with ordinary skill in the art. For example, the positive electrode active material layer can be fabricated in the manner described below.

First, a slurry is fabricated by dispersing the olivine-type positive electrode active material as the positive electrode active material, a conductive assistant and a binder and the like in a dispersion medium. Subsequently, this slurry is coated onto metal foil and dried to obtain a powder for use as a positive electrode active material layer. This powder can then be pressed to obtain the positive electrode active material layer. Furthermore, the binder is not an essential constituent for fabricating the positive electrode active material layer.

The negative electrode active material layer and solid electrolyte layer can be fabricated using similar methods. In addition, an example of another method used to fabricate these layers consists of mixing each of a positive electrode active material layer material, negative electrode active material layer material and solid electrolyte layer material in a dispersion medium, coating each onto metal foil and drying to fabricate each layer.

Furthermore, the olivine-type positive electrode active material present in the positive electrode active material layer is preferably represented by the chemical formula: $Li_XM_YPO_Z$ (wherein, M represents Fe, Mn, Co and Ni, x is such that $0.5 \leq x \leq 1.5$, y is such that $0.5 \leq y \leq 1.5$ and z is such that $2 \leq z \leq 7$). The positive electrode active material is particularly preferably $LiFePO_4$. This is because an all-solid-state battery that uses these olivine-type positive electrode active materials has superior cycling characteristics. $LiFePO_4$ is also particularly preferable because it has a theoretical capacity of 170 mAh/g, which has high theoretical capacity among olivine-type positive electrode active materials, and because it has high material stability and is inexpensive.

<Charge-Discharge Cycling>

The production method of the present disclosure comprises charge-discharge cycling in which the all-solid-state battery is discharged to the electrical potential of the positive electrode active material of 2.1 V (vs. $Li/Li^+$) or lower while maintaining at 25° C. to 80° C.

The lower limit discharge potential may be 2.1 V or lower (vs. $Li/Li^+$), 2.0 V or lower (vs. $Li/Li^+$), 1.9 V or lower (vs. $Li/Li^+$), 1.8 V or lower (vs. $Li/Li^+$), 1.7 V or lower (vs. $Li/Li^+$), 1.6 V or lower (vs. $Li/Li^+$) or 1.5 V or lower (vs. $Li/Li^+$).

In addition, the charge-discharge cycling of the production method of the present disclosure is preferably such that the all-solid-state battery is discharged to a lower limit discharge potential of 1.6 V (vs. $Li/Li^+$) to 2.1 V (vs. $Li/Li^+$). In the case the lower limit discharge potential is excessively high, the resistive layer is unable to be adequately destroyed and battery capacity does not increase even if charge-discharge cycling is repeated. Conversely, if the lower limit discharge potential is excessively low, battery materials in the positive electrode active material layer react due to over-discharging, which is predicted to cause a decrease in capacity, increase in internal capacity or other factors causing deterioration of the positive electrode active material layer.

Moreover, this charge-discharge cycling preferably satisfies the conditions for temperature, charge-discharge rate, upper limit charging potential, lower limit discharge potential and/or the number of times and timing of the charge-discharge cycling as described below.

1. Temperature

The temperature of the all-solid-state battery is preferably maintained at 25° to 80° C., and particularly preferably 40° C. to 80° C., during charge-discharge cycling of the production method of the present disclosure. This is because, by maintaining the temperature of the all-solid-state battery within a certain temperature range during the charge-discharge cycling, the reaction for destroying the resistive layer formed between the olivine-type positive electrode active material and solid electrolyte during charging can be allowed to proceed efficiently. In addition, in the case the temperature is excessively low, the reaction for destroying the resistive layer does not proceed adequately and it becomes necessary to repeat charge-discharge cycling an extremely large number of times, thereby resulting in poor efficiency. Conversely, in the case the temperature is excessively high, other side reactions proceed resulting in deterioration of the positive electrode active material.

The temperature range is preferably 25° C. or higher, 30° C. or higher, 35° C. or higher, 40° C. or higher, 41° C. or higher, 42° C. or higher, 45° C. or higher or 50° C. or higher and 80° C. or lower, 75° C. or lower, 70° C. or lower, 65° C. or lower, 60° C. or lower or 55° C. or lower. The temperature is more preferably 42° C. to 60° C. in order to reduce side reactions while allowing the reaction for destroying the resistive layer to proceed.

2. Charge-Discharge Rate

The charge-discharge rate of charge-discharge cycling of the production method of the present disclosure is preferably 1.0 C or lower. In the case the charge-discharge rate is excessively high, since there is little reaction for destroying the resistive layer, the charge-discharge cycling is required to be repeated for an extremely large number of times. Conversely, by making the charge-discharge rate low, the number of charge-discharge cycles required to remove the resistive layer can be reduced.

The charge-discharge rate may be 1.0 C or less, 0.7 C or less, 0.5 C or less, 0.1 C or less, 0.05 C or less or 0.02 C or less.

When charge-discharge rate is high, the number of required charge-discharge cycles increases. On the other hand, if the rate is low, a single cycle requires considerable time. Thus, the discharge-discharge rate is preferably 0.1 C to 0.5 C based on the balance between the required number of charge-discharge cycles and the amount of time required for a single cycle.

3. Upper Limit Potential

In the charge-discharge cycling of the production method of the present disclosure, the all-solid-state battery is preferably charged to an upper limit charging potential of 3.8 V (vs. $Li/Li^+$) to 4.4 V (vs. $Li/Li^+$). This is because, in the case the upper limit charging potential is excessively high, side reactions end up proceeding and the positive electrode active material deteriorates.

The upper limit charging potential may be 3.8 V or higher (vs. $Li/Li^+$), 4.0 V or higher (vs. $Li/Li^+$) or 4.1 v or higher (vs. $Li/Li^+$), and 4.4 V or lower (vs. $Li/Li^+$), 4.3 V or lower (vs. $Li/Li^+$) or 4.2 V or lower (vs. $Li/Li^+$).

4. Number of Times and Timing of Charge-Discharge Cycling

In the production method of the present disclosure, the number of charge-discharge cycles is preferably at least 3 cycles. This is because, following the formation of a resistive layer during initial charging, the resistive layer is destroyed by repeating several charge-discharge cycles. If the number of charge-discharge cycles is 3 or more, the all-solid-state battery may be charged and discharged for this number of charge-discharge cycles or may be stored for 40 hours or more at 40° C. to 80° C. without charging and discharging. This is because the resistive layer is destroyed further by storing at 40° C. to 80° C.

In addition, this charge-discharge cycling may be carried out continuously or charge-discharge cycling may be carried out under different conditions in between this charge-discharge cycling. However, this charge-discharge cycling is preferably carried out continuously in order to produce the all-solid-state battery of the present disclosure efficiently. In addition, from the same viewpoint, this charge-discharge cycling is preferably carried out from the time of initial charging and discharging, or in other words, from the start.

5. Timing of Completion of Charge-Discharge Cycling

In the production method of the present disclosure, charge-discharge cycling is preferably carried out until the discharge capacity exceeds the discharge capacity of the initial stage of charge-discharge cycling. In the production method of the present disclosure, battery discharge capacity in the early stage of charge-discharge cycling is lower than the previous charge-discharge cycling as a general rule.

The reason for this is thought to be as described below. Namely, in the early stage of charge-discharge cycling, a resistive layer is formed at the interface between the olivine-type positive electrode active material and the sulfide solid electrolyte, and the reaction between the olivine-type positive electrode active material and lithium ions during discharge is inhibited. However, in the method of the present disclosure, since this resistive layer is removed from the interface between the olivine-type positive electrode active material and sulfide solid electrolyte as charge-discharge cycling is further repeated, the number of reactions between the olivine-type positive electrode active material and lithium ions during discharge increases each time cycling is repeated. Thus, when the discharge capacity becomes greater than the discharge capacity in the initial stage of charge-discharge cycling in relation to this increase, the resistance layer can be said to have been adequately removed.

In addition, charge-discharge cycling is preferably carried out until a discharge plateau of the electrical potential of the positive electrode active material layer during discharge is no longer observed at 2.1 V (vs. $Li/Li^+$) to 2.5 V (vs. $Li/Li^+$). Sulfide of the transition metal derived from the olivine-type positive electrode active material contained in the resistive layer reacts with lithium ions at 2.1 V (vs. $Li/Li^+$) to 2.5 V (vs. $Li/Li^+$). In the case a discharge plateau is present within this electrical potential range, this indicates that a reaction is occurring between sulfide of the transition metal derived from the olivine-type positive electrode active material and lithium ions. In other words, this indicates that a resistive layer is present at the interface between the olivine-type positive electrode active material and the sulfide solid electrolyte.

In addition, charge-discharge cycling is preferably carried out until a discharge plateau of the electrical potential of the positive electrode active material layer during discharge appears at 3.3 V (vs. $Li/Li^+$) to 3.5 V (vs. $Li/Li^+$). Since the electrical potential of the reaction between the olivine-type positive electrode active material and lithium ions is present at 3.3 V (vs. $Li/Li^+$) to 3.5 V (vs. $Li/Li^+$), the presence of a discharge plateau within this range indicates that the resistive layer at the interface between the olivine-type positive electrode active material and sulfide solid electrolyte has been adequately removed.

The discharge plateau at 3.3 V (vs. $Li/Li^+$) to 3.5 V (vs. $Li/Li^+$) may be present over a range of discharge capacity of at least 10 mAh/g to 60 mAh/g, 10 mAh/g to 80 mAh/g, 10 mAh/g to 100 mAh/g, 10 mAh/g to 120 mAh/g or 10 mAh/g to 140 mAh/g. In addition, it is preferably present over a range of at least 10 mAh/g to 140 mAh/g. This is because a longer discharge plateau indicates that more of the olivine-type positive electrode active material and lithium ions are reacting.

Furthermore, in the present description, a discharge plateau refers to a flat portion of a curve representing the relationship between voltage and discharge capacity where there are few changes in voltage with respect to changes in discharge capacity. More specifically, this refers to a portion where the rate of change in voltage (V) with respect to the rate of change in discharge capacity (Q) (dV/dQ) per unit weight of positive electrode active material is −0.010 (V/(mAh/g)) to 0.000 (V/(mAh/g)), and for example, −0.005 (V/(mAh/g)) to 0.000 (V/(mAh/g)). This plateau may also be where the value of dV/dQ is −0.005 (V/(mAh/g)) to −0.003 (V/(mAh/g)).

EXAMPLES

<<Verification of Charge-Discharge Cycle Conditions-1>>

An all-solid-state battery was fabricated in the manner indicated below and charge-discharge cycling was repeated under certain conditions.

<Fabrication of all-Solid-State Batteries>

1. Fabrication of Powder for Positive Electrode Active Material Layer $LiFePO_4$ as a positive electrode active material having a carbon coating, vapor-grown carbon fibers (VGCF) as a conductivity, $Li_3PS_4$—LiI—LiBr as a sulfide solid electrolyte, butyl butyrate as a dispersion medium, and vinylidene fluoride (PVDF) as a binder were weighed out and mixed well to fabricate a slurry for the positive electrode active material layer. This positive electrode active material layer slurry was coated onto aluminum foil and dried to obtain a powder for the positive electrode active material layer.

2. Fabrication of Powder for Negative Electrode Active Material Layer $Li_4Ti_5O_{12}$ (LTO) as a negative electrode active material, VGCF as a conductive assistant, $Li_3PS_4$—LiI—LiBr as a sulfide solid electrolyte, butyl butyrate as a dispersion, and PVDF as a binder were weighed out and mixed well to fabricate a slurry for the negative electrode active material layer. This negative electrode active material layer slurry was coated onto aluminum foil and dried to obtain a powder for the negative electrode active material layer.

3. Fabrication of Solid Electrolyte Layer

Sulfide solid electrolyte, binder and dispersion medium in the form of dehydrated heptane were mixed well to fabricate a slurry for the solid electrolyte layer. This solid electrolyte layer slurry was coated onto aluminum foil and dried to obtain a solid electrolyte layer.

4. Battery Assembly

The solid electrolyte layer was pressed followed by placing a prescribed weighed amount of the powder for the positive electrode active material layer thereon and pressing to form the positive electrode active material layer. A prescribed amount of the powder for the negative electrode active material layer was weighed out and pressed to form the negative electrode active material layer. The negative electrode active material layer was then laminated on the solid electrolyte layer of the positive electrode active material layer followed by assembling into an all-solid-state battery by binding together with a jig.

<Charge-Discharge Cycling>

Charge-discharge cycling was repeated on the all-solid-state batteries fabricated according to the aforementioned method under the conditions for lower limit discharge potential, upper limit charging potential, charge-discharge rate and temperature shown in the following Table 1. The relationships between battery voltage, battery capacity and discharge capacity during charge-discharge cycling were measured. In the following description, discharge capacity is indicated as battery capacity.

1. Explanation of Table

As shown in Table 1, Examples 1 and 2 and Reference Example 1 indicate cases in which charge-discharge cycling was repeated while changing only the lower limit discharge potential and holding temperature, charge-discharge rate and upper limit charging potential constant. In addition, Examples 3 to 6 indicate cases in which charge-discharge cycling was repeated while changing only the upper limit charging potential and holding temperature, charge-discharge rate and lower limit discharge potential constant. In addition, Examples 7 to 11 indicate cases in which charge-discharge cycling was repeated while changing only the charge-discharge rate while holding temperature, upper limit charging potential and lower limit discharge potential constant. In addition, Examples 12 to 15 and Reference Example 2 indicate cases in which charge-discharge cycling was repeated while changing only the temperature while holding charge-discharge rate, upper limit charging potential and lower limit discharge potential constant.

In addition, in Table 1, "Effect" refers to an assessment of whether or not discharge capacity increased as a result of repeating charge-discharge cycling. An "OK" in the "Effect" column indicates the case in which discharge capacity was able to be increased, while a "NG" mark indicates the case in which discharge capacity was unable to be increased. In addition, "C/P" indicates the case in which, although discharge capacity increased as a result of charge-discharge cycling, the amount of the side reaction was too high (example 6), and the case in which, although discharge capacity increased as a result of charge-discharge cycling, discharge capacity was unable to be adequately increased unless charge/discharge cycling was carried out for an extremely large number of cycles (Example 12).

In addition, in Table 1, "Drawing" indicates the drawing representing the relationship between battery voltage, charging capacity and battery capacity when charge-discharge cycling have been repeated according to each condition. In FIGS. 15A to 18C, voltage is described as the electrical potential with respect to the electrical potential of the

TABLE 1

| | Production Conditions | | | | Results | | |
|---|---|---|---|---|---|---|---|
| | Lower Limit Discharge Potential (V (vs. Li/Li$^+$)) | Upper Limit Charging Potential (V (vs. Li/Li$^+$)) | Charge-discharge Rate (C) | Temperature (° C.) | Final Discharge Capacity (mAh/g) | Effect | Drawing |
| Example 1 | 1.6 | 4.1 | 0.1 | 60 | 175 | OK | 18A |
| Example 2 | 2.1 | 4.1 | 0.1 | 60 | 155 | OK | 18B |
| Reference Example 1 | 2.3 | 4.1 | 0.1 | 60 | 10 | NG | 18C |
| Example 3 | 1.6 | 3.8 | 0.1 | 60 | 168 | OK | 17A |
| Example 4 | 1.6 | 4.1 | 0.1 | 60 | 175 | OK | 17B |
| Example 5 | 1.6 | 4.4 | 0.1 | 60 | 175 | OK | 17C |
| Example 6 | 1.6 | 4.7 | 0.1 | 60 | 205 | C/P[1] | 17D |
| Example 7 | 1.6 | 4.1 | 0.02 | 60 | 175 | OK | 16A |
| Example 8 | 1.6 | 4.1 | 0.05 | 60 | 168 | OK | 16B |
| Example 9 | 1.6 | 4.1 | 0.1 | 60 | 175 | OK | 16C |
| Example 10 | 1.6 | 4.1 | 0.5 | 60 | 160 | OK | 16D |
| Example 11 | 1.6 | 4.1 | 1 | 60 | 145 | OK | 16E |
| Example 12 | 1.6 | 4.1 | 0.1 | 25 | 138 | C/P | 15A |
| Example 13 | 1.6 | 4.1 | 0.1 | 42 | 165 | OK | 15B |
| Example 14 | 1.6 | 4.1 | 0.1 | 60 | 175 | OK | 15C |
| Example 15 | 1.6 | 4.1 | 0.1 | 80 | 110 | OK | 15D |
| Reference Example 2 | 1.6 | 4.1 | 0.1 | 100 | 25 | NG | 15E |

[1]C/P: Conditionally Passed reaction between LTO and lithium ions when LTO for the negative electrode active material (electrical potential vs. LTO) have been used. In contrast, in the present disclosure, it should be understood that voltage is described as the electrical potential with respect to the deposition voltage of lithium metal (V (vs. $Li/Li^+$)). The electrical potential of the reaction between LTO and lithium ions (V (vs. LTO)) can be converted to the electrical potential with respect to the deposition potential of lithium metal (V (vs. $Li/Li^+$)) by adding a voltage of 1.6 V. In FIGS. 15A to 17C, the electrical potential with respect to the deposition potential of lithium metal (V (vs. $Li/Li^+$)) is described in parentheses below the electrical potential (V (vs. $Li/Li^+$))) with respect to the electrical potential of the reaction between LTO and lithium ions (V (vs. LTO)). Furthermore, in FIGS. 15A to 18C, battery capacity is the capacity per unit weight of the positive electrode active material.

2. Results (1) Lower Limit Discharge Potential

Examples 1 and 2, Reference Example 1

With respect to Examples 1 and 2 and Reference Example 1, charge-discharge cycling was repeated while maintaining the lower limit discharge potential at 1.6 V (vs. $Li/Li^+$), 2.1 V (vs. $Li/Li^+$) and 2.3 V (vs. $Li/Li^+$), respectively. As a result, with respect to Examples 1 and 2, although battery capacity decreased during the first few cycles, as a result of subsequently further repeating charging and discharging for up to 20 cycles, all-solid-state batteries having a large battery capacity were able to be obtained. In contrast, in Reference Example 1, battery voltage did not increase despite repeating charge-discharge cycling, and an all-solid-state battery having a large battery capacity was unable to be obtained.

Figure 18A:
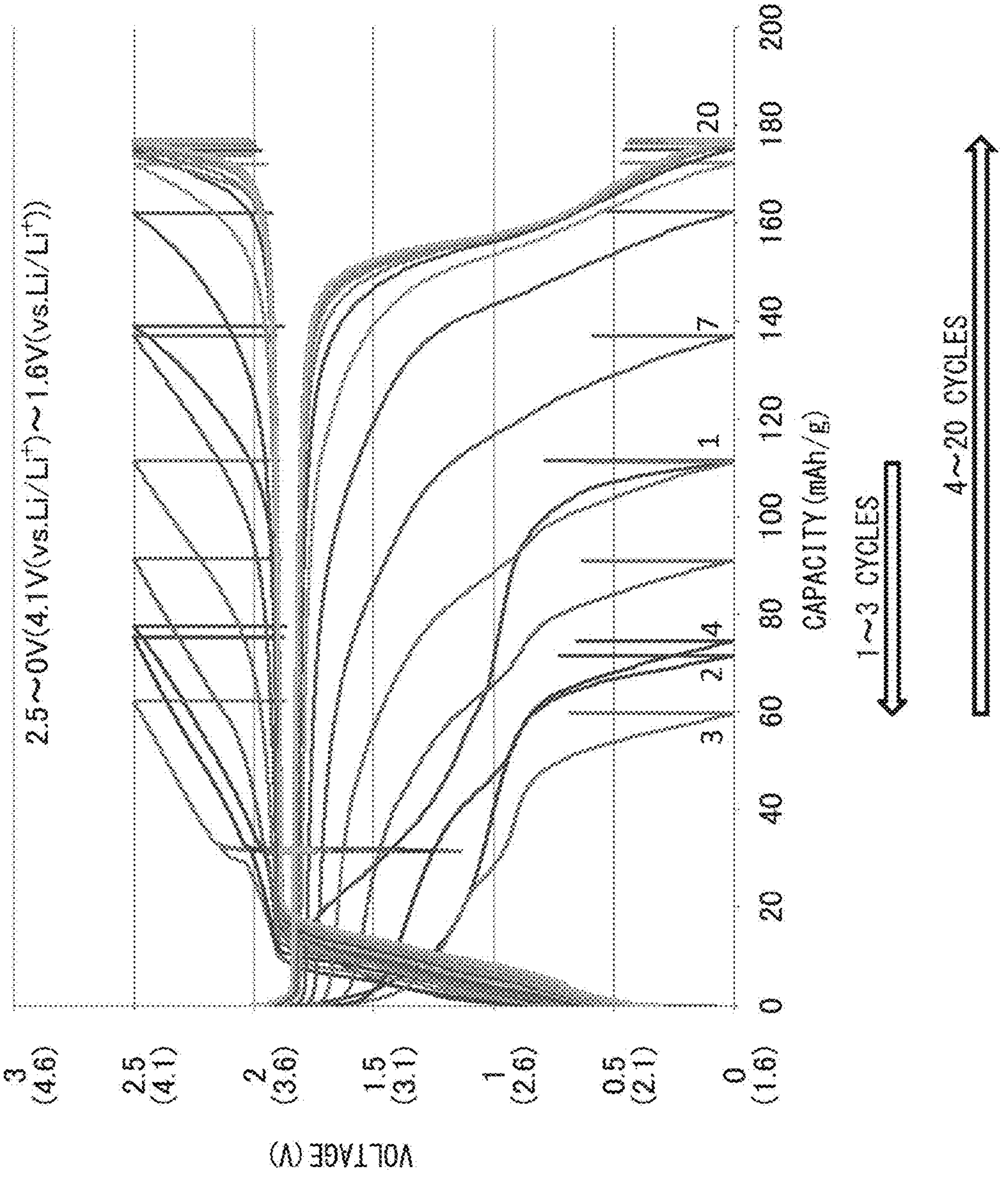
FIG. 18A is a graph representing the relationship between voltage and battery capacity when charge-discharge cycling have been repeated while maintaining the lower limit discharge potential of a positive electrode active material layer at 1.6 V (vs. $Li/Li^+$).
Figure 18B:
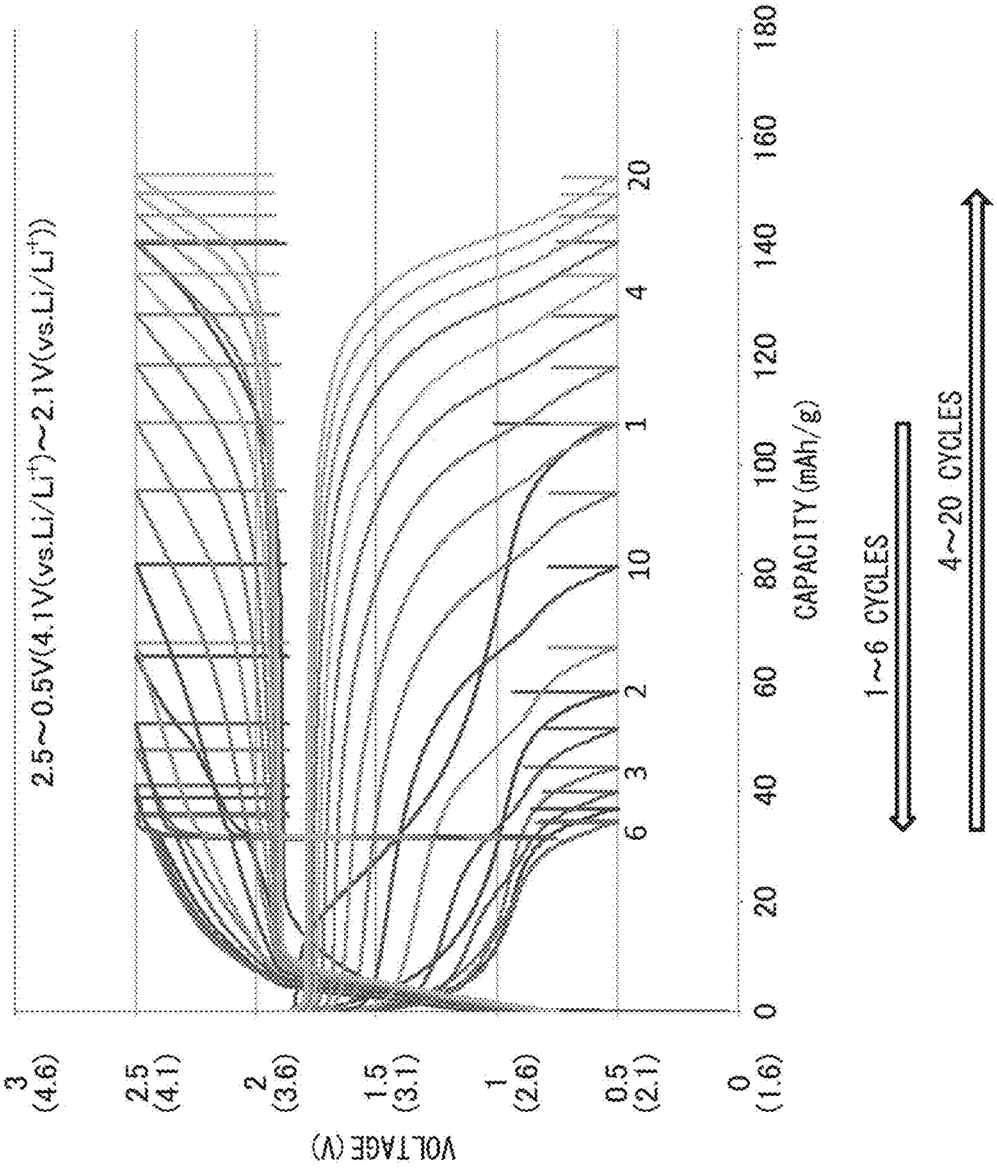
FIG. 18B is a graph representing the relationship between voltage and battery capacity when charge-discharge cycling have been repeated while maintaining the lower limit discharge potential of a positive electrode active material layer at 2.1 V (vs. $Li/Li^+$).
Figure 18C:
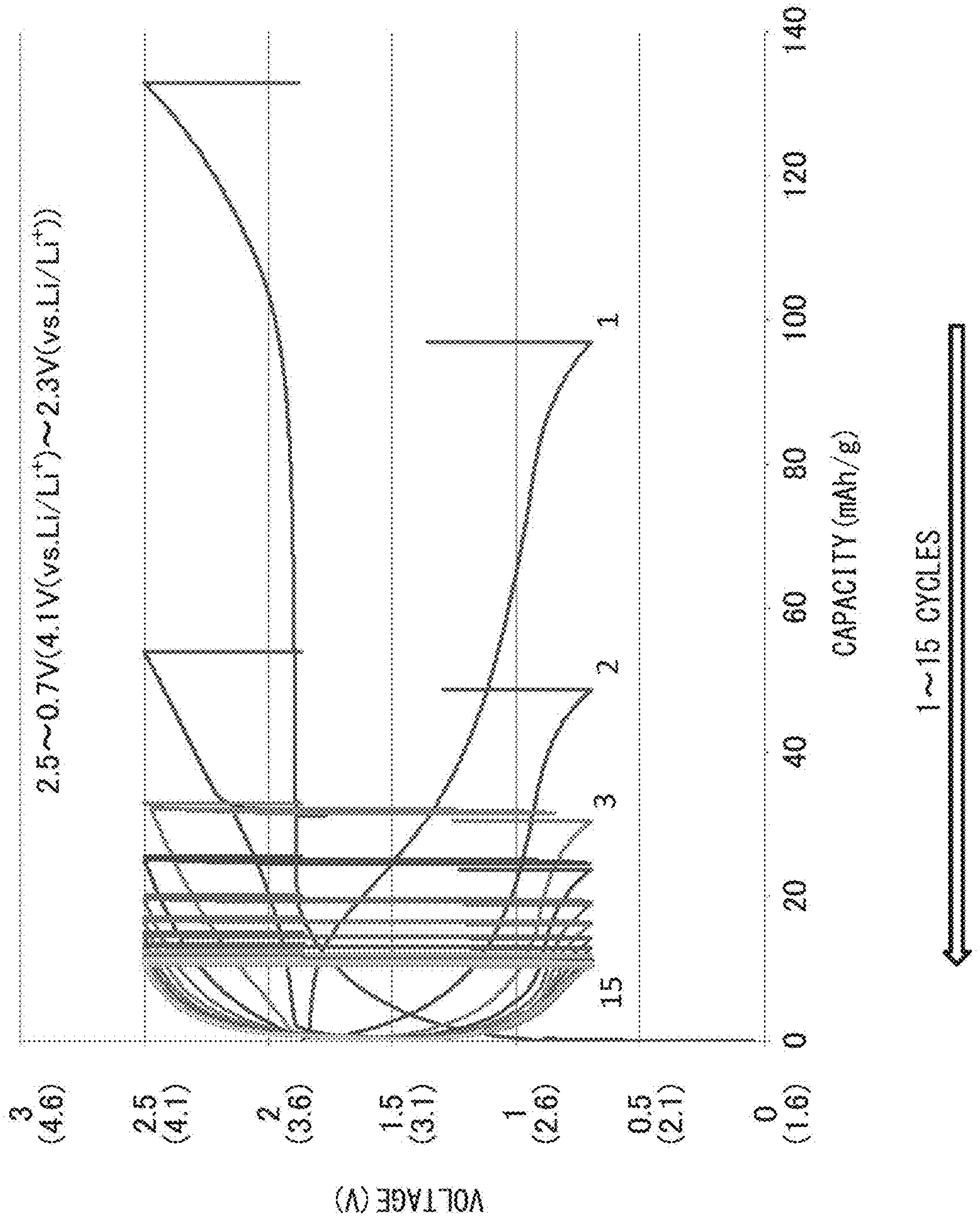
FIG. 18C is a graph representing the relationship between voltage and battery capacity when charge-discharge cycling have been repeated while maintaining the lower limit discharge potential of a positive electrode active material layer at 2.3 V (vs. $Li/Li^+$).

In FIGS. 18A and 18B, reaction plateaus are sufficiently present at 2.1 V (vs. $Li/Li^+$) to 2.5 V (vs. $Li/Li^+$). In contrast, although a reaction plateau is observed at 2.1 V (vs. $Li/Li^+$) to 2.5 V (vs. $Li/Li^+$), discharge ends partway through the reaction plateau in FIG. 18C. This is thought to indicate that, in contrast to the resistive layer having been adequately destroyed in Examples 1 and 2, in which the all-solid-state batteries discharged to a voltage lower than the electrical potential of 2.1 V (vs. $Li/Li^+$) to 2.5 V (vs. $Li/Li^+$) of the reaction between lithium ions and the resistive layer in the form of iron sulfide, the resistive layer was not sufficiently destroyed in Reference Example 1, in which the all-solid-state battery only discharged to 2.3 V.

(2) Upper Limit Charging Potential

Examples 3 to 6

With respect to Examples 3 to 6, charge-discharge cycling was repeated for the fabricated all-solid-state batteries at an upper limit charging potential of 3.8 V (vs. $Li/Li^+$), 4.1 V (vs. $Li/Li^+$), 4.4 V (vs. $Li/Li^+$) and 4.7 V (vs. $Li/Li^+$), respectively. As a result, when charge-discharge cycling in Examples 3 to 5 have been carried out, namely at an upper limit charging potential of 3.8 V (vs. $Li/Li^+$) to 4.4 V (vs. $Li/Li^+$), all-solid-state batteries were obtained having battery capacity of 168 mAh/g to 175 mAh/g that approaches the theoretical capacity of $LiFePO_4$. In contrast, when charge-discharge cycling at 4.7 V (vs. $Li/Li^+$) in the manner of Example 6 has been repeated, the battery capacity of 205 mAh/g was larger than the theoretical capacity of $LiFePO_4$.

Figure 17A:
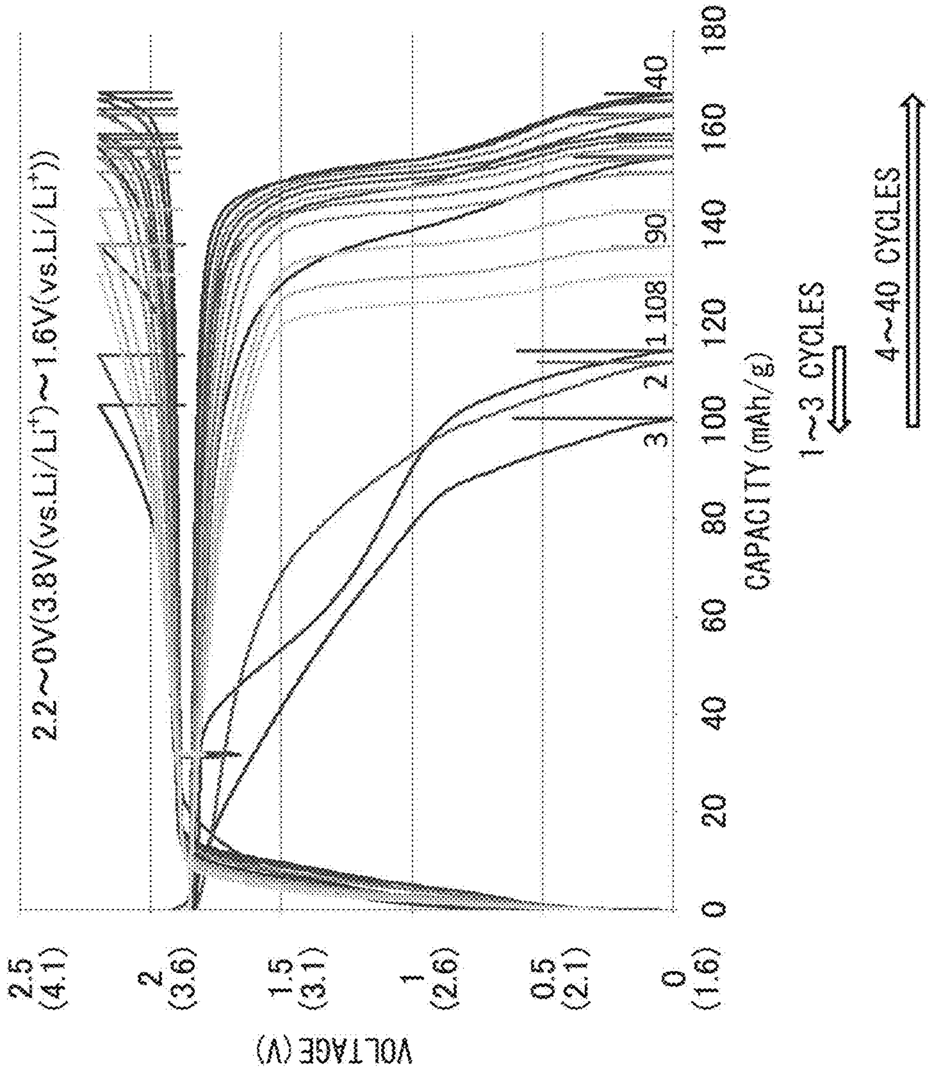
FIG. 17A is a graph representing the relationship between voltage and battery capacity when charge-discharge cycling have been repeated while maintaining the upper limit charging potential of a positive electrode active material layer at 3.8 V (vs. $Li/Li^+$).
Figure 17B:
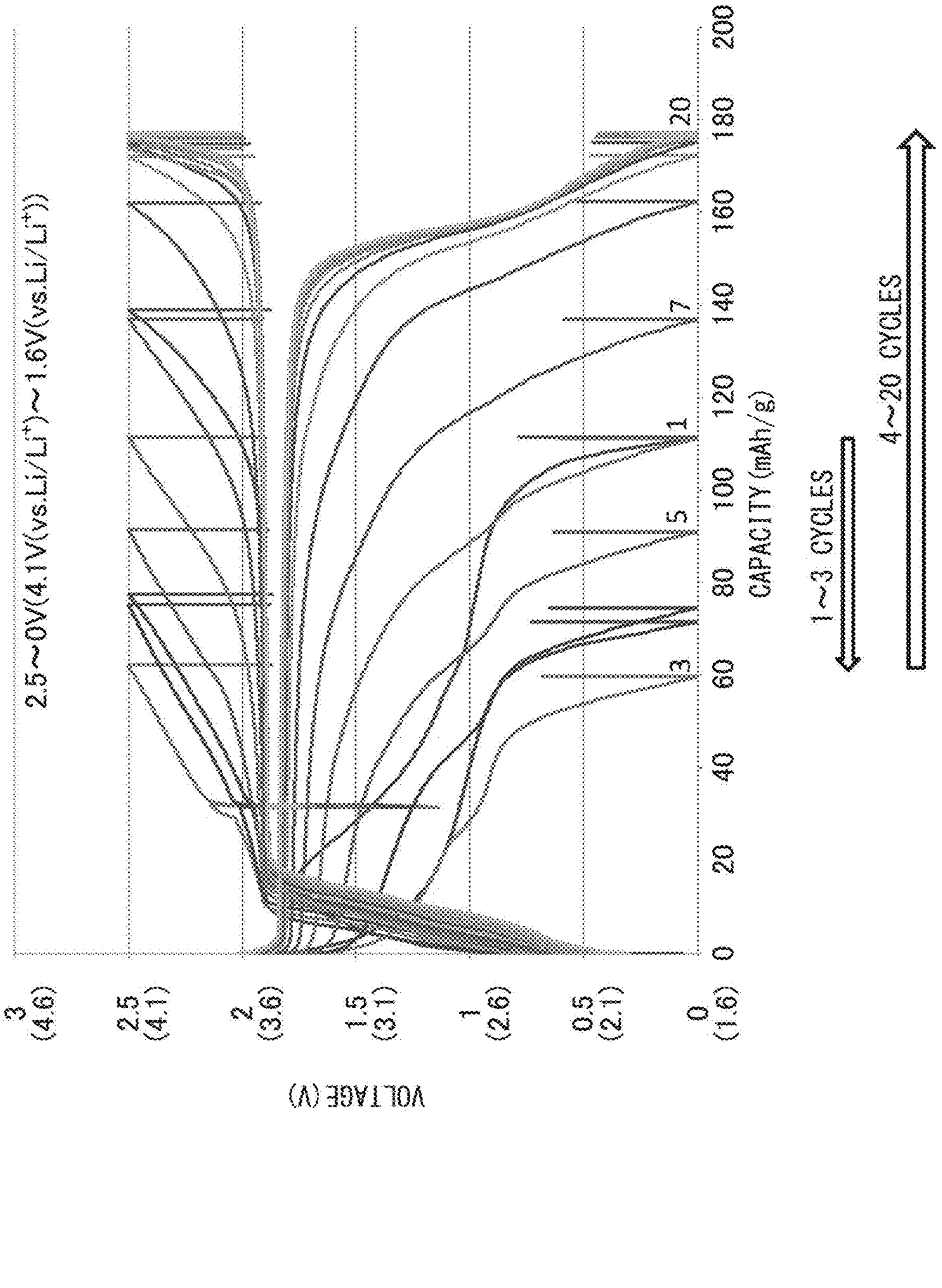
FIG. 17B is a graph representing the relationship between voltage and battery capacity when charge-discharge cycling have been repeated while maintaining the upper limit charging potential of a positive electrode active material layer at 4.1 V (vs. $Li/Li^+$).
Figure 17C:
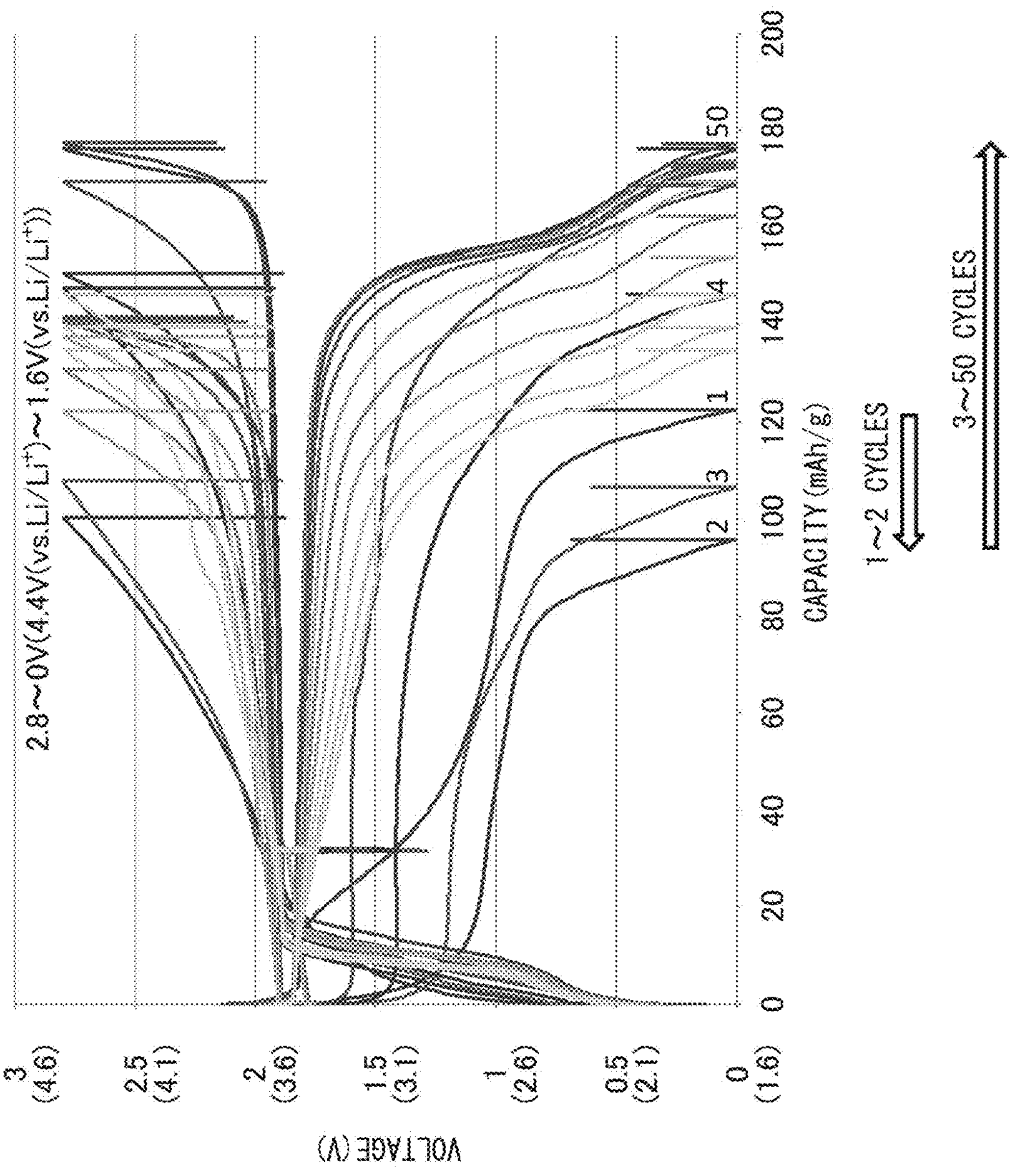
FIG. 17C is a graph representing the relationship between voltage and battery capacity when charge-discharge cycling have been repeated while maintaining the upper limit charging potential of a positive electrode active material layer at 4.4 V (vs. $Li/Li^+$).

When charge-discharge cycling at an upper limit charging potential of 3.8 V (vs. $Li/Li^+$) to 4.4 V (vs. $Li/Li^+$) as in FIGS. 17A to 17C have been carried out, battery capacity decreased during the first several cycles, and potential plateaus appeared in the vicinity of 2.1 V (vs. $Li/Li^+$) to 2.5 V (vs. $Li/Li^+$). Subsequently, as a result of repeating charge-discharge cycling, the potential plateaus in the vicinity of 2.1 V (vs. $Li/Li^+$) to 2.5 V (vs. $Li/Li^+$) were no longer observed, potential plateaus appeared at 3.3 V (vs. $Li/Li^+$) to 3.5 V (vs. $Li/Li^+$), and battery capacity increased. When a comparison is made among FIGS. 17A to 17C, as the upper limit charging potential became higher, there was an increase in the number of charge-discharge cycles required until the appearance of a potential plateau at 3.3 V (vs. $Li/Li^+$) to 3.5 V (vs. $Li/Li^+$). This is thought to be due to side reactions occurring more significantly as the upper limit potential became higher.

Figure 17D:
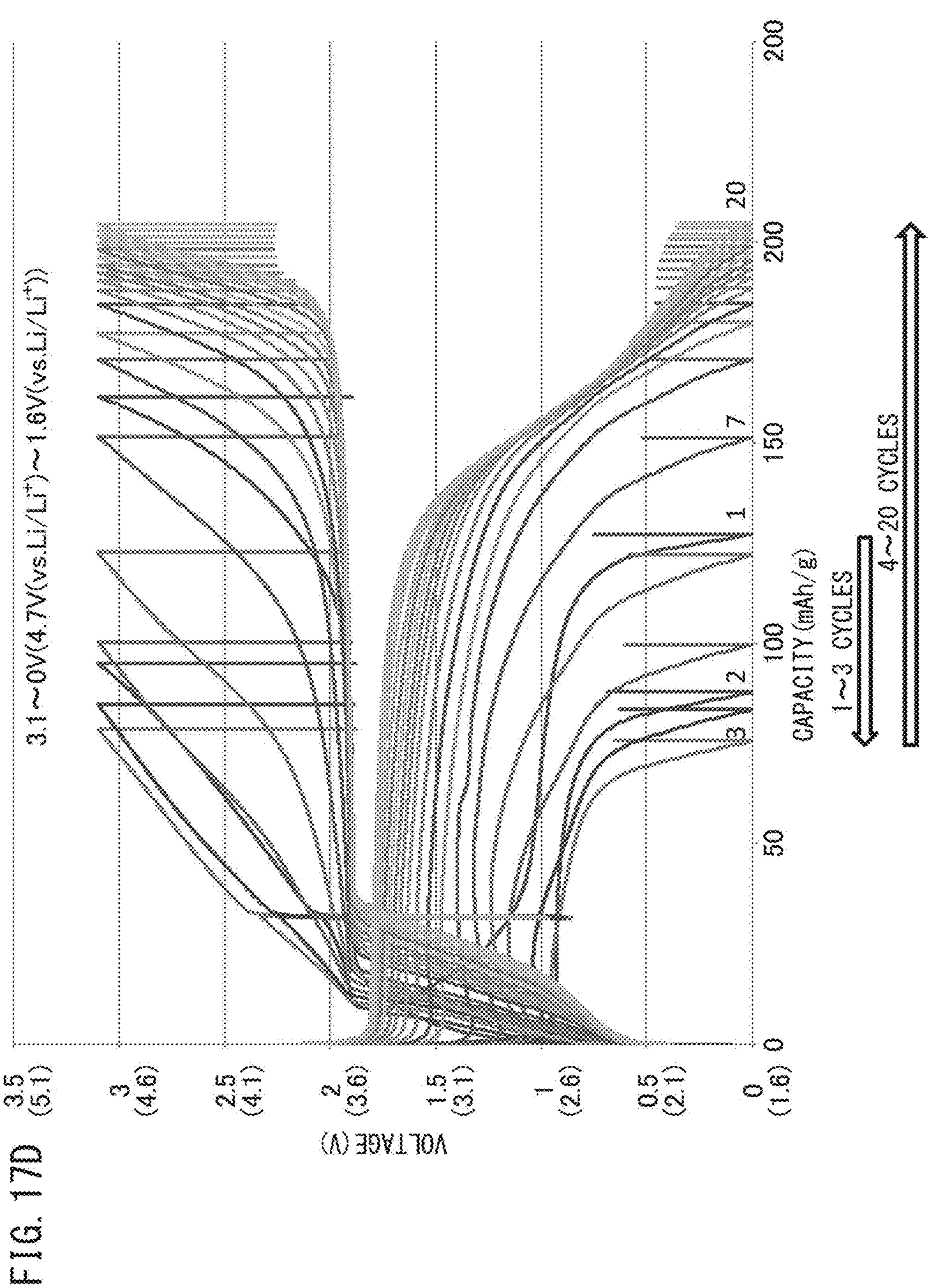
FIG. 17D is a graph representing the relationship between voltage and battery capacity when charge-discharge cycling have been repeated while maintaining the upper limit charging potential of a positive electrode active material layer at 4.7 V (vs. $Li/Li^+$).

In Example 6, in which charge-discharge cycling was carried out at an upper limit charging potential of 4.7 V (vs. $Li/Li^+$) as shown in FIG. 17D, battery capacity decreased during the first several cycles and battery capacity increased as a result of subsequently repeating charge-discharge cycling in the same manner as Examples 3 to 5. However, battery capacity was greater than the theoretical capacity of $LiFePO_4$ after 20 cycles. In addition, the potential plateau at 3.3 V (vs. $Li/Li^+$) to 3.5 V (vs. $Li/Li^+$) was shorter. This indicates that numerous side reactions were occurring in Example 6.

(3) Charge-Discharge Rate

Examples 7 to 11

The all-solid-state batteries fabricated in Examples 7 to 11 were repeatedly subjected to charge-discharge cycling while maintaining a charge-discharge rate of 0.02 C, 0.05 C, 0.1 C. 0.5 C or 1.0 C, respectively. As a result, large battery capacities were obtained in all cases. When a charge-discharge rate was 0.5 C or less in particular, namely in Examples 7 to 10, all-solid-state batteries were obtained that had battery capacity of 160 mAh/g to 175 mAh/g, closely approximately the theoretical capacity of $LiFePO_4$. When charge-discharge cycling have been carried out at a charge-discharge rate of 1.0 C, namely in Example 11, a larger number of charge-discharge cycles were required in comparison with the other cases. However, an all-solid-state battery was able to be obtained that had high battery capacity of about 145 mAh/g.

Figure 16A:
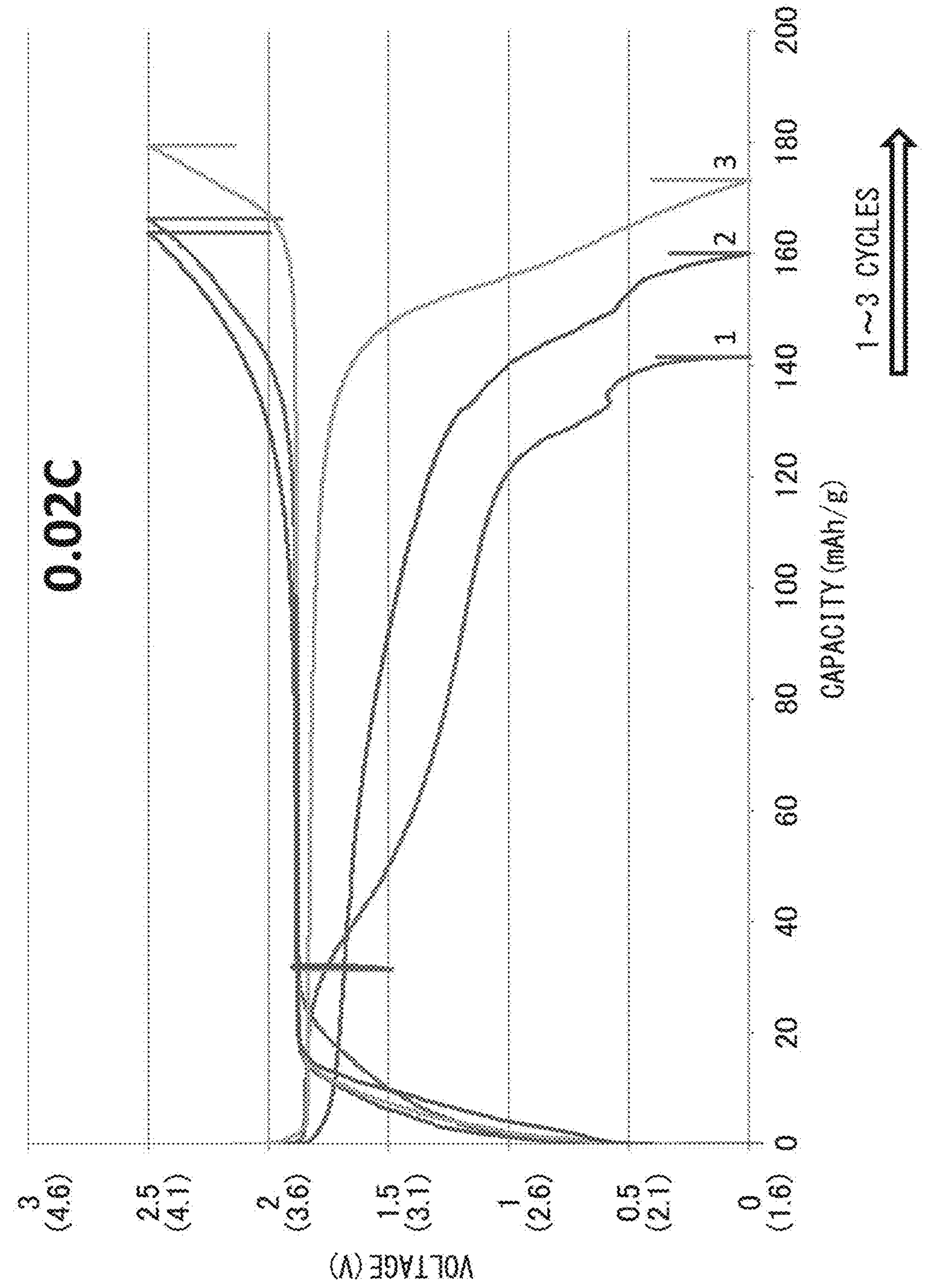
FIG. 16A is a graph representing the relationship between voltage and battery capacity when charge-discharge cycling have been repeated while maintaining the charge-discharge rate at 0.02 C.
Figure 16B:
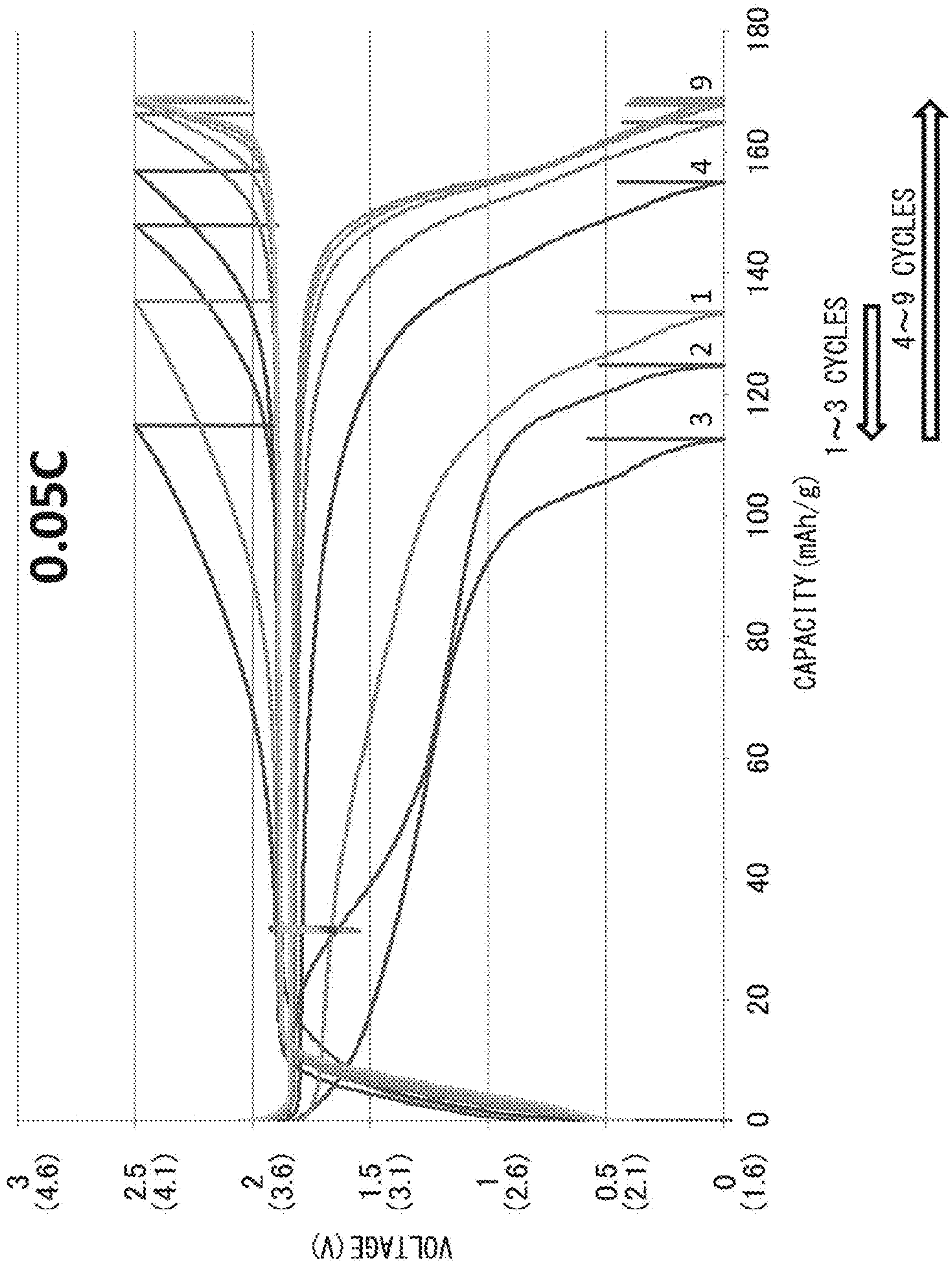
FIG. 16B is a graph representing the relationship between voltage and battery capacity when charge-discharge cycling have been repeated while maintaining the charge-discharge rate at 0.05 C.
Figure 16C:
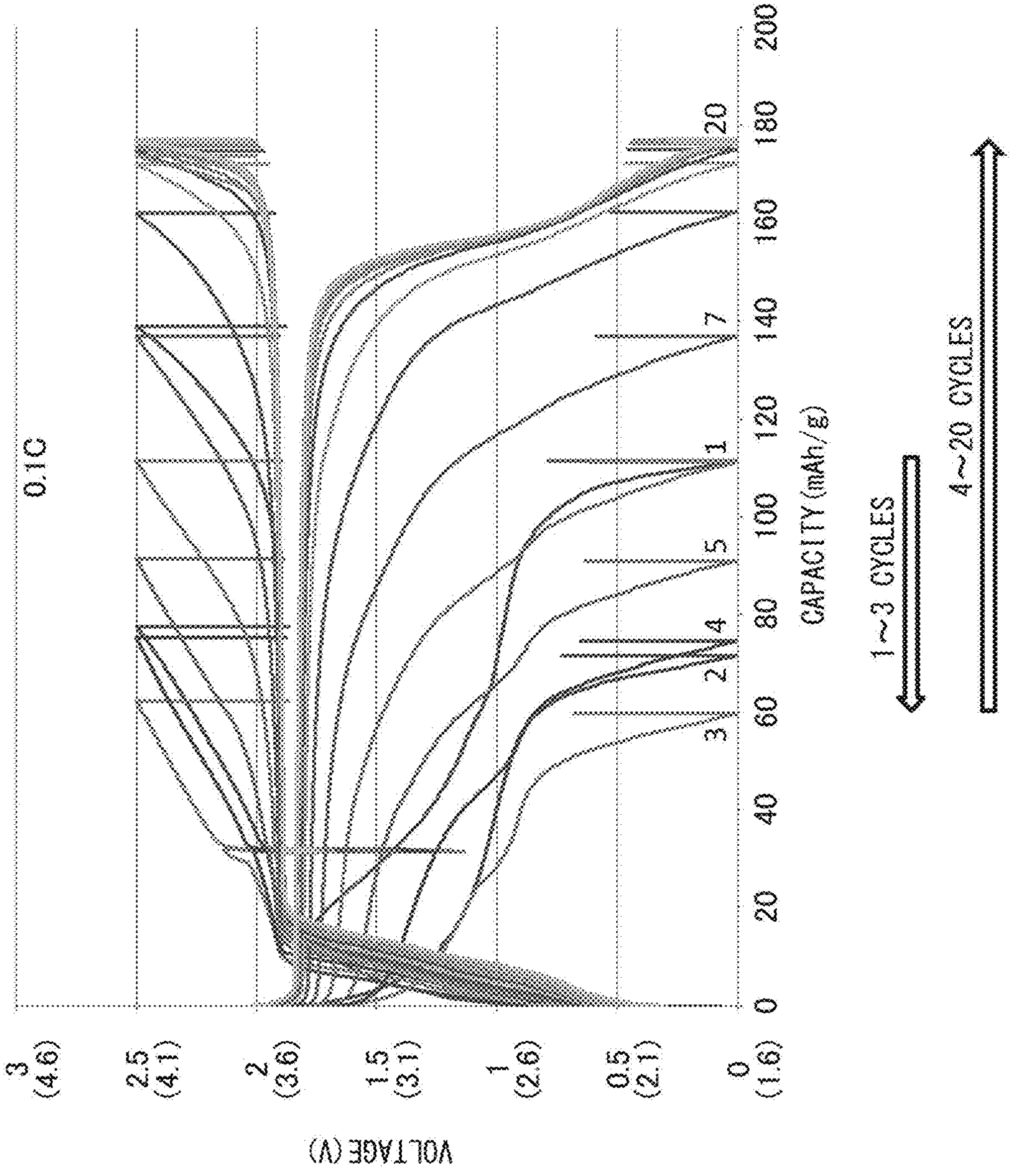
FIG. 16C is a graph representing the relationship between voltage and battery capacity when charge-discharge cycling have been repeated while maintaining the charge-discharge rate at 0.1 C.
Figure 16D:
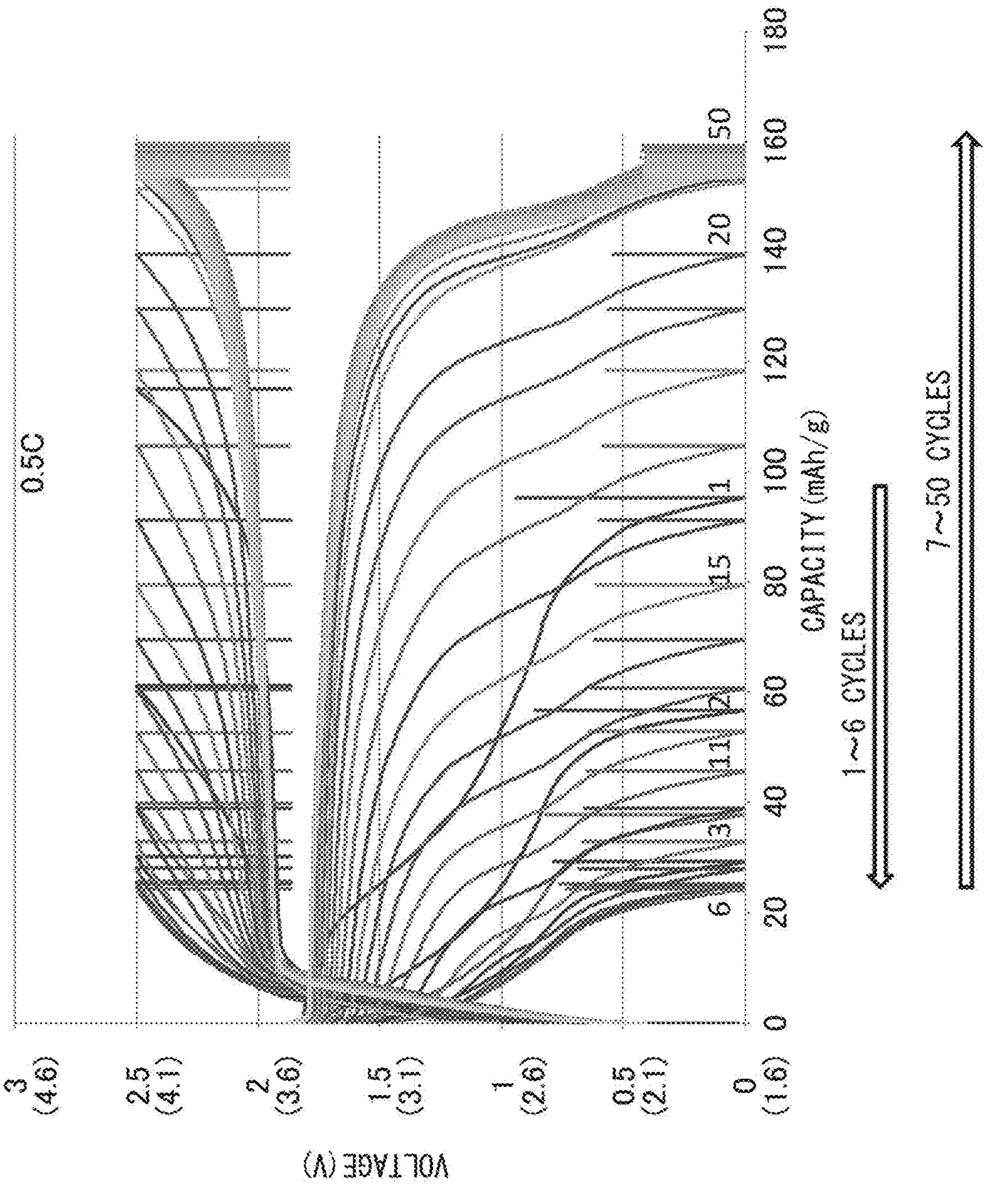
FIG. 16D is a graph representing the relationship between voltage and battery capacity when charge-discharge cycling have been repeated while maintaining the charge-discharge rate at 0.5 C.

As shown in FIGS. 16B to 16D, in Examples 8 to 10, in which charge-discharge cycling was repeated at 0.05 C, 0.1 C and 0.5 C, potential plateaus appeared at 2.1 V (vs. $Li/Li^+$) to 2.5 V (vs. $Li/Li^+$) during the first several cycles of discharging, and as a result of subsequently repeating cycling, potential plateaus in the vicinity of 2.1 V (vs. $Li/Li^+$) to 2.5 V (vs. $Li/Li^+$) were no longer observed, and potential plateaus appeared at 3.3 V (vs. $Li/Li^+$) to 3.5 V (vs. $Li/Li^+$).

This is thought to be due to the resistive layer composed of ion sulfide formed during initial charging have been destroyed by reacting with lithium ions during the first several cycles, followed by the resistive layer being separated from the interface between the positive electrode active material and sulfide solid electrolyte as a result of subsequent charge-discharge cycling, thereby allowing the positive electrode active material to adequately react with lithium ions in Examples 8 to 10.

Figure 16E:
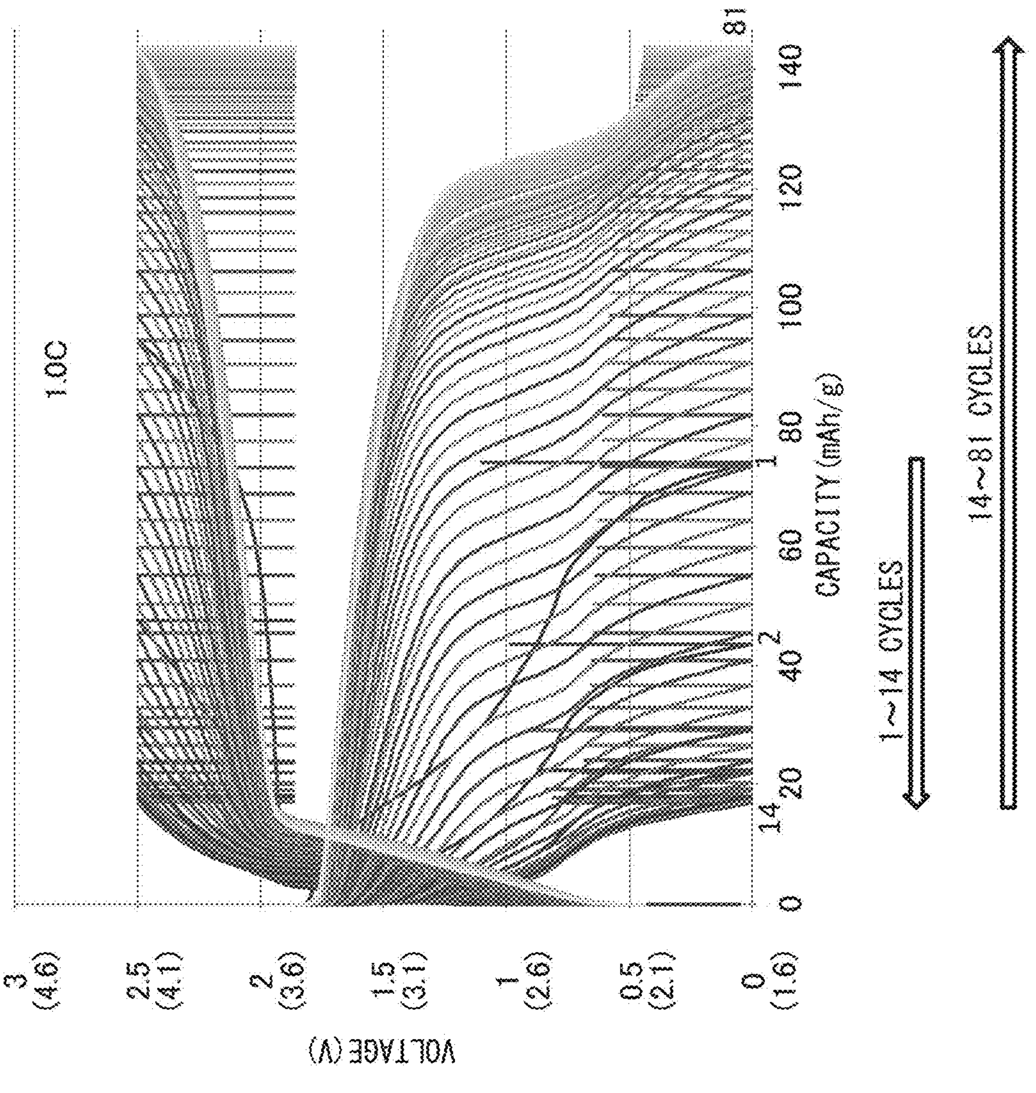
FIG. 16E is a graph representing the relationship between voltage and battery capacity when charge-discharge cycling have been repeated while maintaining the charge-discharge rate at 1.0 C.

In addition, as shown in FIG. 16E, in Example 11, in which charge-discharge cycling was repeated at a charge-discharge rate of 1.0 C, a potential plateau appeared at 2.1 V (vs. $Li/Li^+$) to 2.5 V (vs. $Li/Li^+$) during the first several cycles. However, this potential plateau at 2.1 V (vs. $Li/Li^+$) to 2.5 V (vs. $Li/Li^+$) did not disappear even after having repeated charge-discharge cycling numerous times, and battery capacity continued to decrease even after having repeated charge-discharge cycling for 14 cycles. When charge-discharge cycling was further repeated, battery capacity gradually rose, the potential plateau in the vicinity of 2.1 V (vs. $Li/Li^+$) to 2.5 V (vs. $Li/Li^+$) was no longer observed, and a potential plateau appeared at 3.3 V (vs. $Li/Li^+$) to 3.5 V (vs. $Li/Li^+$).

Finally, battery capacity stabilized after charge-discharge cycling had been repeated for 81 cycles. This is thought to be due to the short duration of discharge due to the excessively high charge-discharge rate, and since there was therefore little reaction between the resistive layer and lithium ions during a single cycle, the resistance layer had to be destroyed by using a larger number of charge-discharge cycles in comparison with the case of a lower charge-discharge rate.

Conversely, as shown in FIG. 16A, in Example 7, in which charge-discharge cycling was repeated at a charge-discharge rate of 0.02 C, a potential plateau appeared in the vicinity of 2.1 V (vs. $Li/Li^+$) to 2.5 V (vs. $Li/Li^+$) during initial discharge. Subsequently, however, the potential plateau in the vicinity of 2.1 V (vs. $Li/Li^+$) to 2.5 V (vs. $Li/Li^+$) was no longer observed during the second discharge cycle, while a potential plateau appeared at 3.3 V (vs. $Li/Li^+$) to 3.5 V (vs. $Li/Li^+$) in the third cycle. This is thought to be due to the long duration of discharge caused by the low charge-discharge rate, resulting in more reactions between the resistive layer and lithium ions during a single cycle.

(4) Temperature

Examples 12 to 15 and Reference Example 2

The all-solid-state batteries of Examples 13 to 15 were repeatedly subjected to charge-discharge cycling while maintaining the temperature of the battery at 42° C., 60° C. and 80° C., respectively. As a result, although battery capacity decreased during the first three to four cycles, as a result of subsequently further repeating charge-discharge cycling up to 20 cycles, all-solid-state batteries were able to be obtained that demonstrated high battery capacity.

In particular, battery capacities that approached the theoretical capacity of $LiFePO_4$ were able to be realized in Example 13 (about 165 mAh/g) and Example 14 (about 175 mAh/g). In addition, final battery capacity in Example 15 was about 110 mAh/g, thereby making it possible to realize high battery capacity, although lower than the theoretical capacity of $LiFePO_4$.

Figure 15A:
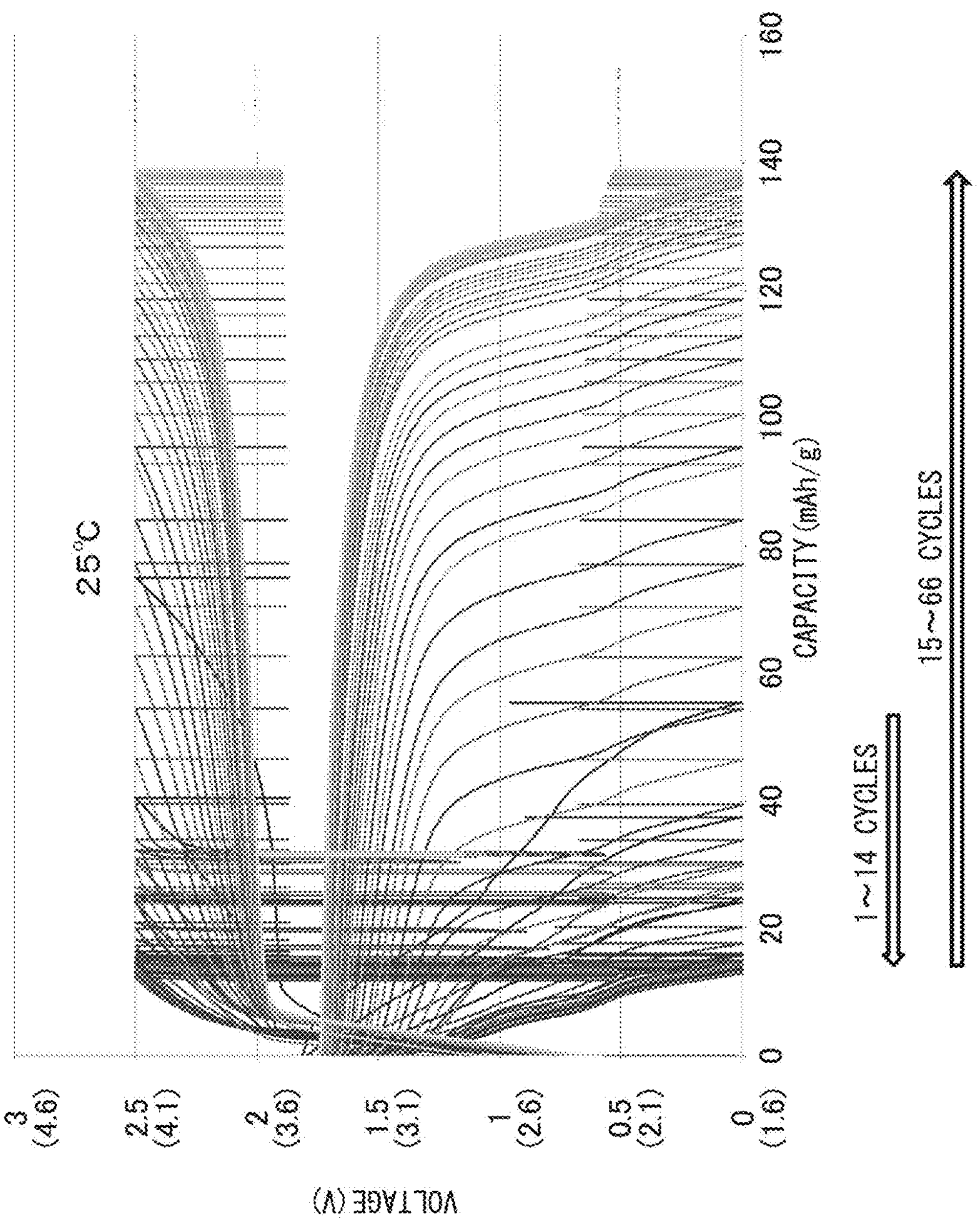
FIG. 15A is a graph representing the relationship between voltage and battery capacity of an all-solid-state battery which has been repeatedly charged-discharged while maintaining the temperature at 25° C.
Figure 15B:
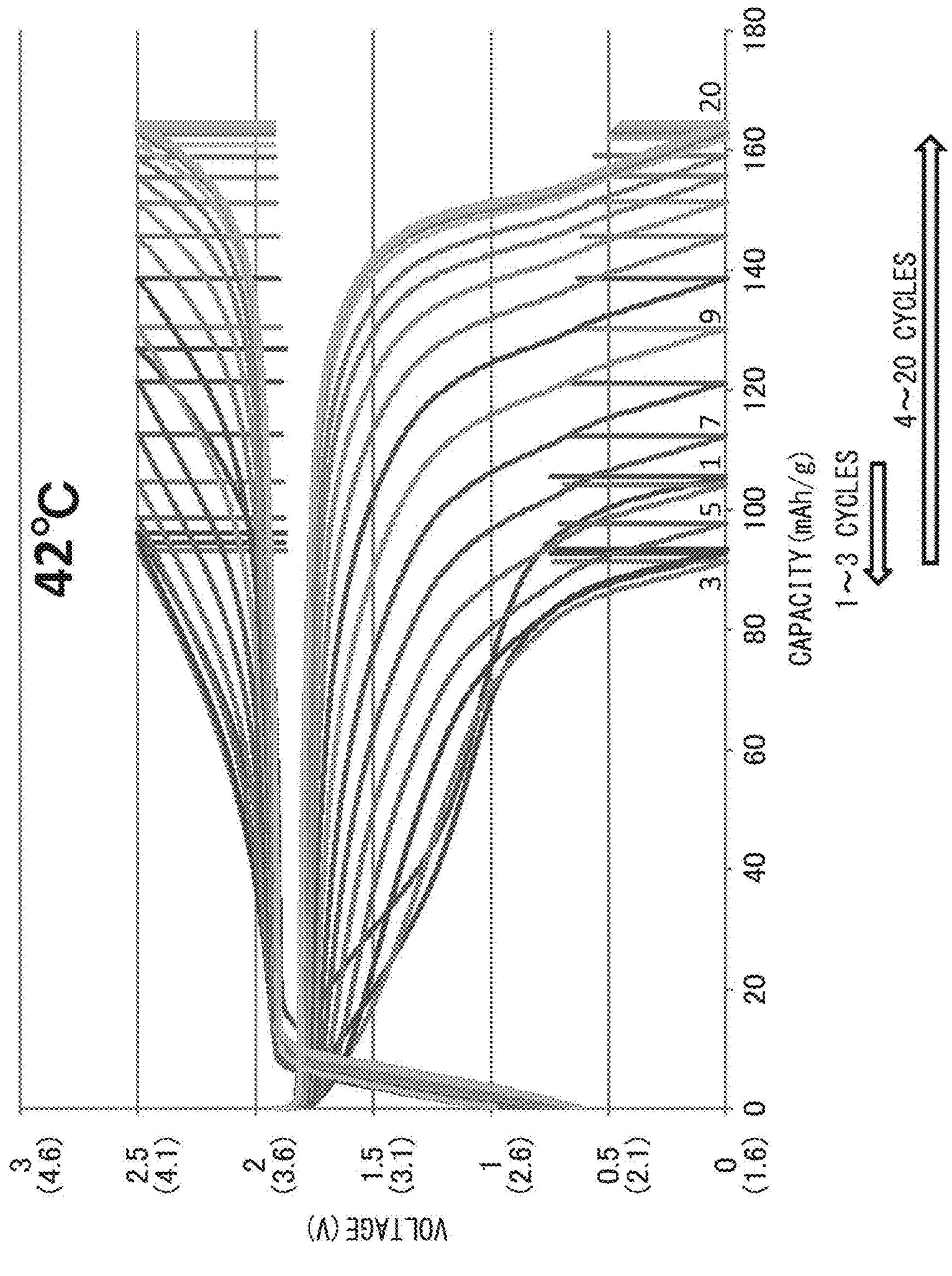
FIG. 15B is a graph representing the relationship between voltage and battery capacity of an all-solid-state battery which has been repeatedly charged-discharged while maintaining the temperature at 42° C.
Figure 15C:
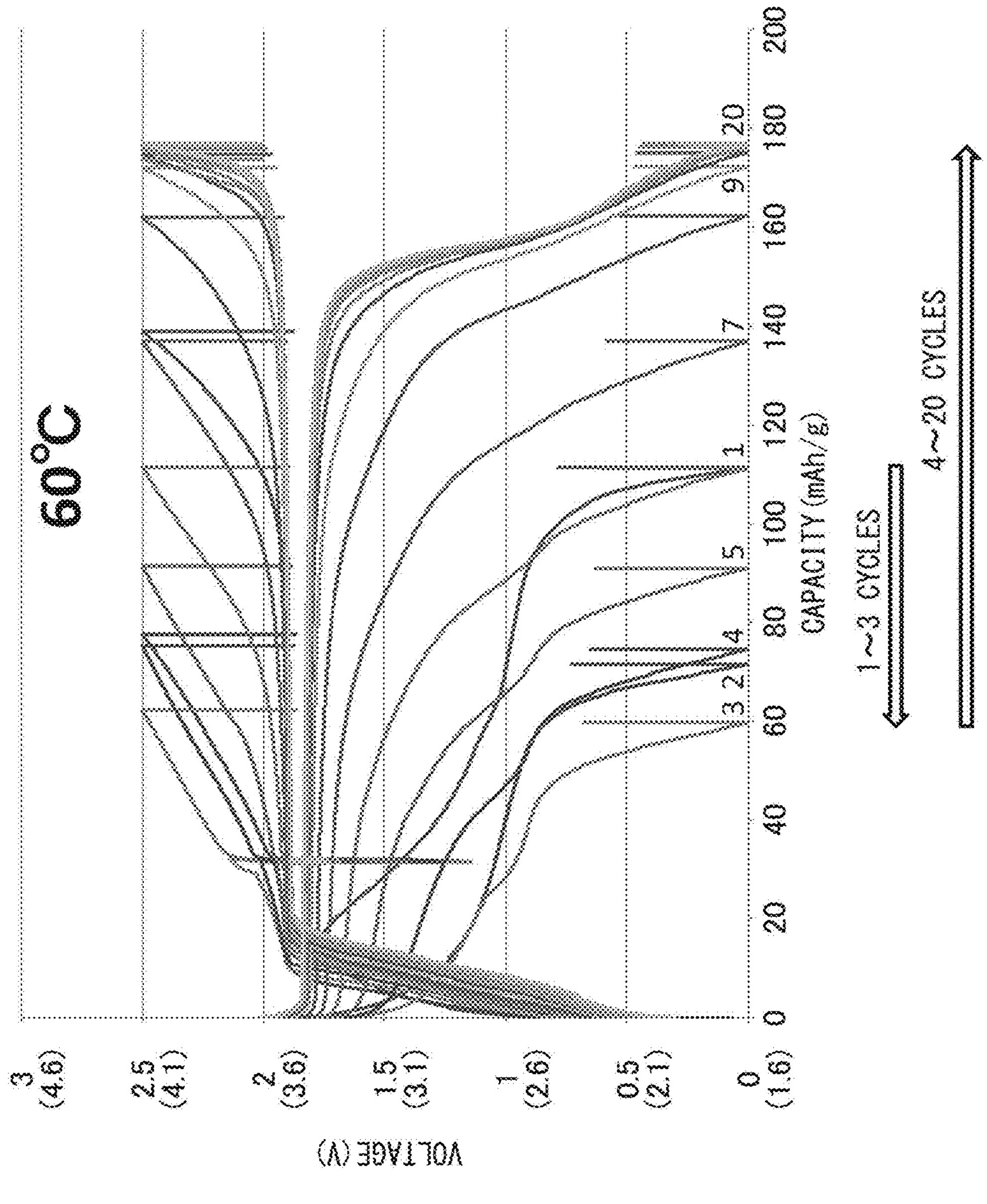
FIG. 15C is a graph representing the relationship between voltage and battery capacity of an all-solid-state battery which has been repeatedly charged-discharged while maintaining the temperature at 60° C.

In Examples 13 and 14, in which charge-discharge cycling was repeated while maintaining the temperatures of the all-solid-state batteries at 42° C. and 60° C., respectively, as shown in FIGS. 15B and 15C, although battery capacity gradually decreased during the first three to four cycles, as a result of subsequently repeating charge-discharge cycling, battery capacity gradually increased, eventually stabilizing at about 165 mAh/g to 175 mAh/g after 20 cycles.

As shown in FIGS. 15B and 15C, in Examples 13 and 14, potential plateaus appeared at 2.1 V (vs. $Li/Li^+$) to 2.5 V (vs. $Li/Li^+$) corresponding to the electrical potential of the reaction between iron sulfide and lithium ions during the first three to four discharge cycles. These potential plateaus gradually decreased each time cycling was subsequently repeated, and potential plateaus formed at 3.3 V (vs. $Li/Li^+$) to 3.5 V (vs. $Li/Li^+$) corresponding to the reaction potential of $LiFePO_4$ after 20 cycles.

In Example 13 and 14, this is thought to be due to the resistive layer composed of iron sulfide formed during initial charging being destroyed by reacting with lithium ions during the first three to four cycles, and as a result of the resistive layer having been separated from the interface between the positive electrode active material and sulfide solid electrolyte due to subsequent charge-discharge cycling, the positive electrode active material was able to adequately react with lithium ions.

In addition, when looking at FIG. 15D, when charge-discharge cycling has been repeated while maintaining the temperature of the all-solid-state battery at 80° C. as in Example 15, battery capacity gradually decreased during the first three to four cycles and then subsequently increased and stabilized as a result of repeating charge-discharge cycling in the same manner as when charge-discharge cycling have been repeated while maintaining the temperature of the all-solid-state battery at 42° C. or 60° C. However, when a temperature has been set at 80° C., although battery capacity increased as a result of repeating charge-discharge cycling, the final battery capacity was about 110 mAh/g, which was lower than when charge-discharge cycling have been carried out at 42° C. or 60° C. This is thought to be due to a reduction in battery capacity attributable to deterioration of the positive electrode active material as charge-discharge cycling was repeated due to the high battery temperature.

Figure 15D:
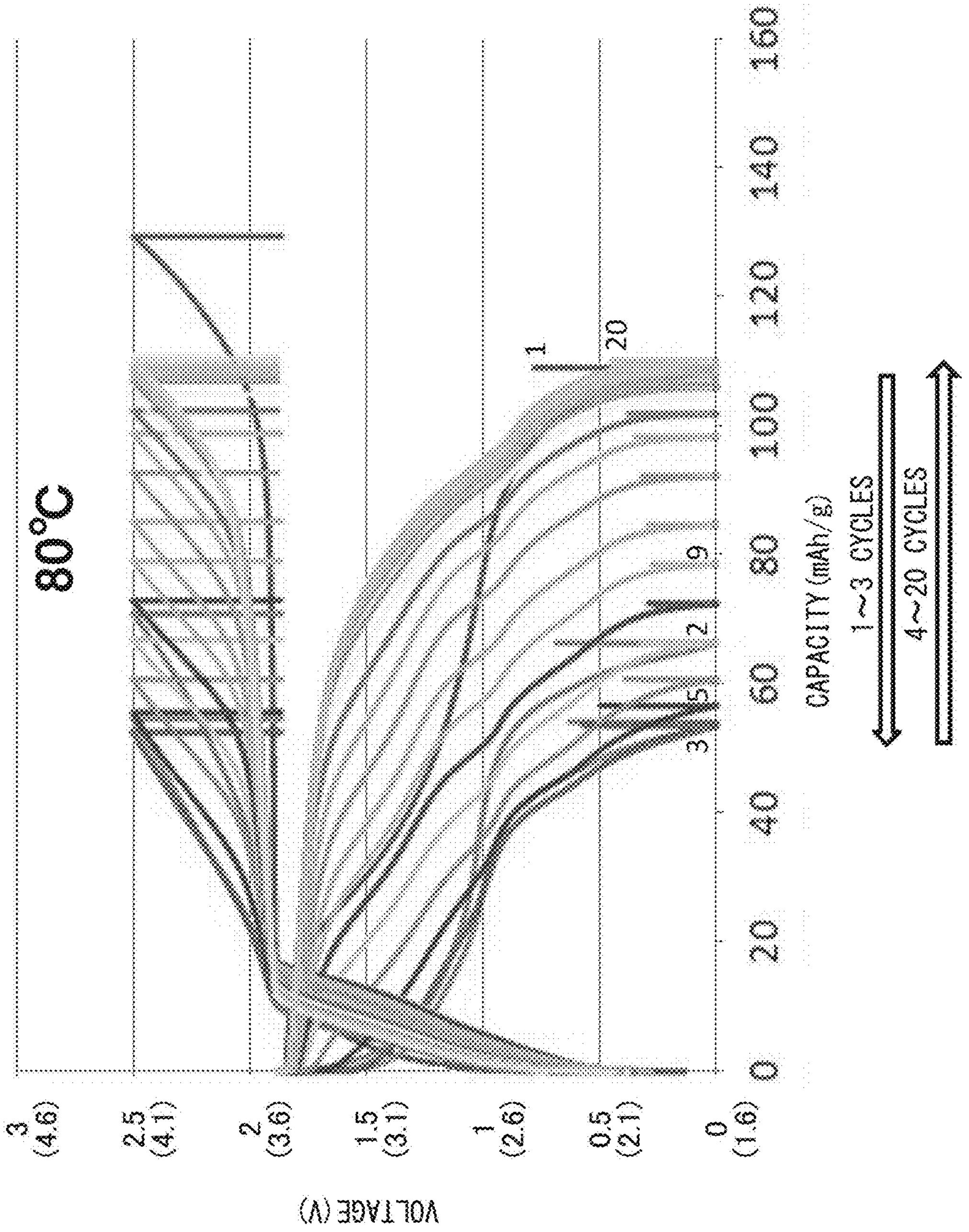
FIG. 15D is a graph representing the relationship between voltage and battery capacity of an all-solid-state battery which has been repeatedly charged-discharged while maintaining the temperature at 80° C.

In addition, when a temperature was set at 80° C. as shown in FIG. 15D, the discharge curve was determined to decrease gradually (representing a decrease in capacity) at 2.6 V (vs. $Li/Li^+$) to 3.4 V (vs. $Li/Li^+$), and this is presumed to have been caused by the occurrence of side reactions.

On the other hand, in Example 12, in which charge-discharge cycling was repeated while maintaining the temperature of the all-solid-state battery at 25° C., the final battery capacity stabilized at about 138 mAh/g.

In Example 12 as shown in FIG. 15A, a potential plateau at 2.1 V (vs. $Li/Li^+$) to 2.5 V (vs. $Li/Li^+$) was hardly observed at all even after repeating charging and discharging, and battery capacity decreased each time charge-discharge cycling was repeated. However, battery capacity gradually began to rise starting at 14 cycles. Battery capacity had increased to about 138 mAh/g after 66 cycles.

This is thought to be due to hardly any of the resistive layer formed at the interface between the positive electrode active material and sulfide solid electrolyte reacting with lithium ions due to the excessively low temperature of the all-solid-state battery, thereby requiring a larger number of charge-discharge cycles until the resistive layer was destroyed.

Figure 15E:
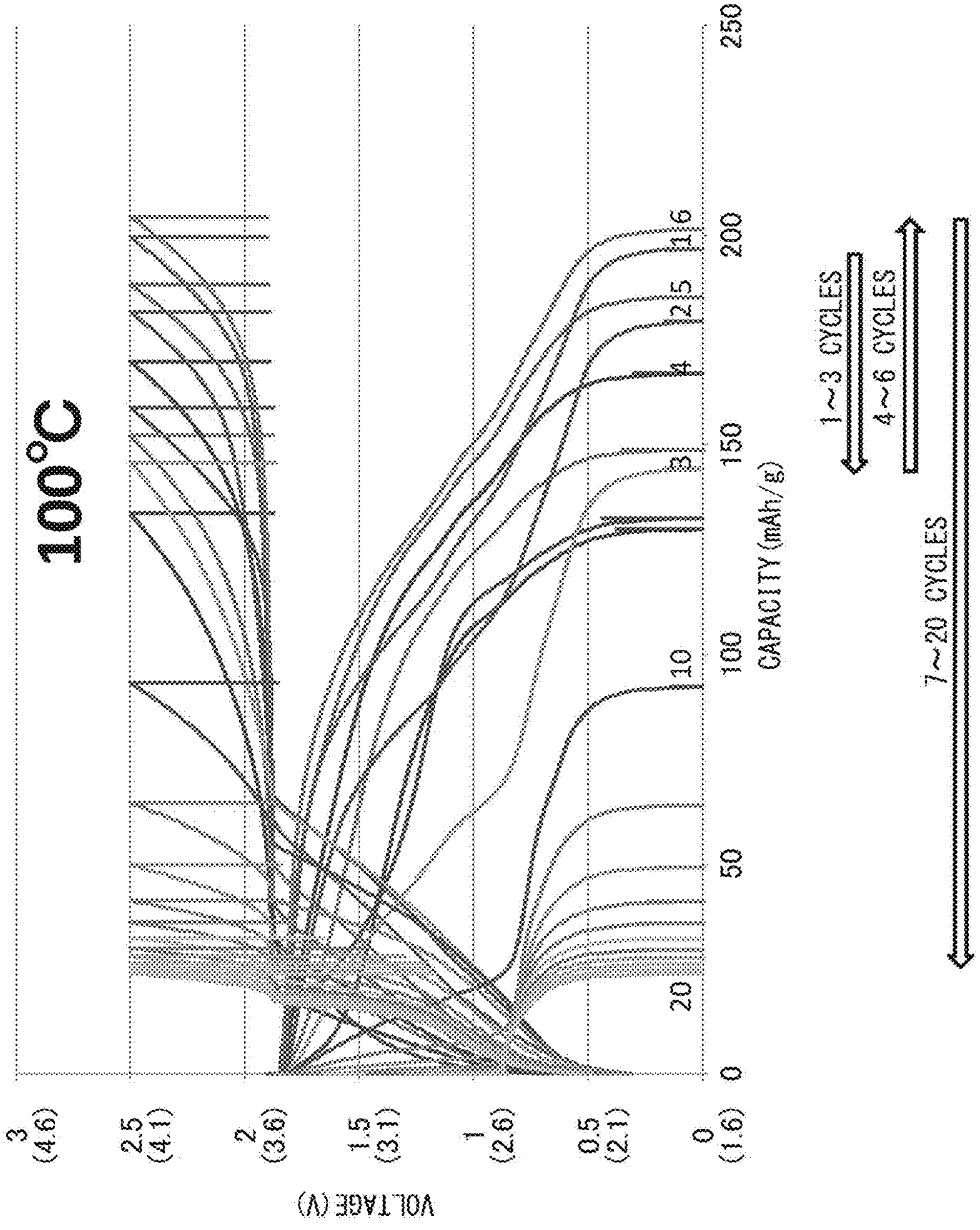
FIG. 15E is a graph representing the relationship between voltage and battery capacity of an all-solid-state battery which has been repeatedly charged-discharged while maintaining the temperature at 100° C.

In Reference Example 2, in which the temperature of the all-solid-state battery was maintained at 100° C., a potential plateau appeared at 2.1 V (vs. $Li/Li^+$) to 2.5 V (vs. $Li/Li^+$) during the first several cycles as shown in FIG. 15E. In addition, battery capacity increased to about 200 when charge-discharge cycling was repeated for 4 to 6 cycles. However, a potential plateau did not appear at 3.3 V (vs. $Li/Li^+$) to 3.5 V (vs. $Li/Li^+$) even if charge-discharge cycling was repeated and battery capacity gradually decreased, eventually decreasing to about 25 mAh/g, which is considerably less than the theoretical capacity of $LiFePO_4$.

In this manner, when charge-discharge cycling has been repeated while maintaining battery temperature at 100° C., the temporary increase in battery voltage indicates that the resistive layer reacts with lithium ions during discharge resulting in a portion of the resistive layer being destroyed. However, since the temperature was excessively high, the positive electrode active material deteriorated and battery capacity was thought to have decreased as charge-discharge cycling was repeated.

In addition, when a temperature is set to 100° C. as shown in FIG. 15E, the discharge curve was determined to decrease gradually (representing a decrease in capacity) at 2.6 V (vs. $Li/Li^+$) to 3.4 V (vs. $Li/Li^+$), and this is presumed to have been caused by the occurrence of side reactions.

<<Verification of Charge-Discharge Cycle Conditions-2>>

Example 16

An all-solid-state battery was fabricated in the same manner as described in the section entitled "<Fabrication of All-solid-state Batteries>" of the aforementioned section entitled "<<Verification of Charge-Discharge Cycle Conditions-1>>". Three cycles of charging and discharging were carried out on this all-solid-state battery at a lower limit discharge potential of 2.1 V (vs. $Li/Li^+$), upper limit charging potential of 4.1 V ((vs. $Li/Li^+$), charge-discharge rate of 0.1 C, and battery temperature of 60° C. Subsequently, the all-solid-state battery was stored for 40 hours at 80° C. to fabricate an all-solid-state battery.

This all-solid-state battery was then charged and discharged at a lower limit discharge potential of 2.1 V (vs. $Li/Li^+$), upper limit charging potential of 4.1 V ((vs. $Li/Li^+$), charge-discharge rate of 0.1 C and battery temperature of 60° C. followed by measurement of the battery capacity thereof.

<Results and Discussion>

Figure 19:
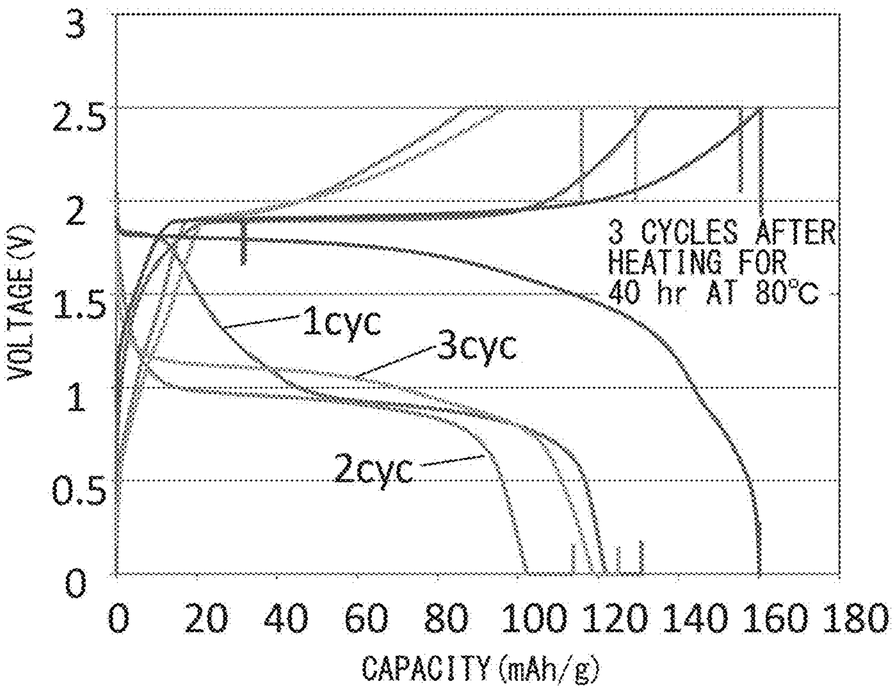
FIG. 19 is a graph representing the relationship between voltage and battery capacity when an all-solid-state battery has been stored for 40 hours at 80° C. following charge-discharge cycling.

FIG. 19 is a graph representing the relationship between battery voltage and charging capacity and battery capacity during each charge-discharge cycle of this all-solid-state battery.

As shown in this graph, a potential plateau was present at 2.1 V (vs. $Li/Li^+$) to 2.5 V (vs. $Li/Li^+$) through the first three cycles in Example 16. However, the potential plateau at 2.1 V (vs. $Li/Li^+$) to 2.5 V (vs. $Li/Li^+$) was no longer observed and a potential plateau was instead observed at 3.3 V (vs. $Li/Li^+$) to 3.5 V (vs. $Li/Li^+$) during subsequent charge-discharge cycling after having stored the battery for 40 hours at 80° C. In addition, battery capacity increased to about 160 mAh/g.

In this manner, the reason for disappearance of the potential plateau at 2.1 V (vs. $Li/Li^+$) to 2.5 V (vs. $Li/Li^+$) and the increase in battery voltage as a result of storing for 40 hours at 80° C. is thought to be due to the resistive layer, which had been destroyed during the first three cycles of charge-discharge cycling, having been further destroyed as a result of storing the battery at a high temperature.

<<Verification of Structure of Positive Electrode Active Material of Present Disclosure>>

The structures of positive electrode active materials were compared in an all-solid-state battery which was produced according to the production method of the present disclosure and an all-solid-state battery produced according to a method of the prior art.

Example 17

An all-solid-state battery was fabricated in the same manner as in the aforementioned section entitled "<<Verification of Charge-Discharge Cycle Conditions-1>>", and charging and discharging were repeated for 20 cycles at a temperature of 60° C., charge-discharge rate of 0.1 C, upper limit charging potential of 4.1 V (vs. $Li/Li^+$) and lower limit discharge potential of 1.6 V (vs. $Li/Li^+$) to complete the all-solid-state battery of Example 17.

The positive electrode active material layer of the completed all-solid-state battery was observed with a scanning electron microscope.

Figure 8A:
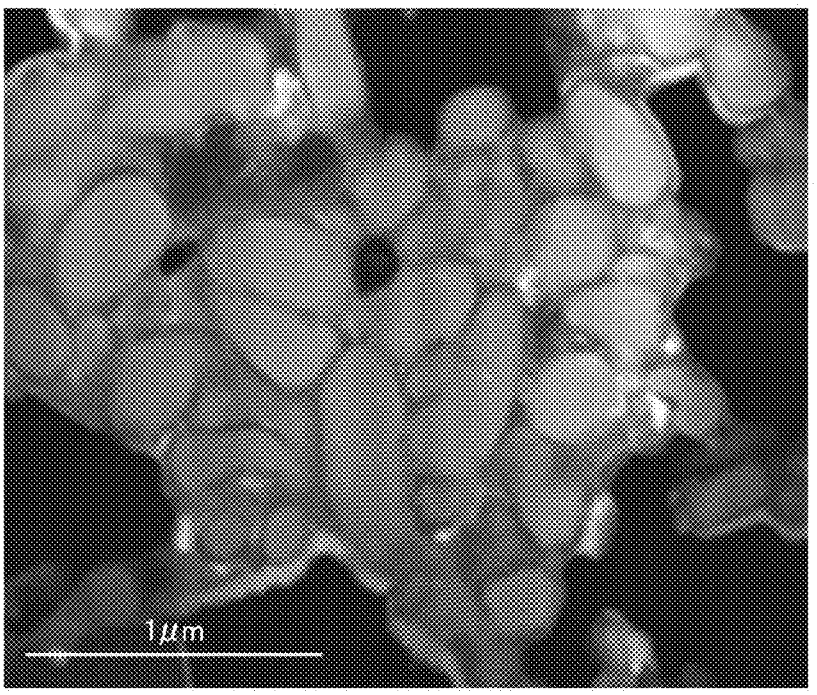
FIG. 8(*a*) is a transmission electron microscopy (TEM) image of the olivine-type positive electrode active material portion, coating layer portion and sulfide solid electrolyte according to one or more embodiments disclosed and described herein.
Figure 8B:
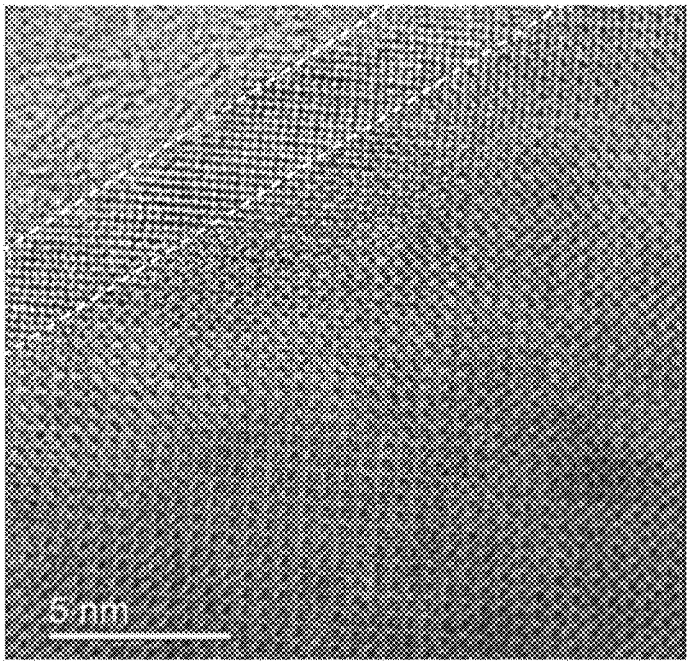

FIG. 8(*a*) is a micrograph obtained by transmission electron microscopy (TEM) of secondary particles of the positive electrode active material layer. In shown in this micrograph, the positive electrode active material of the present disclosure can be observed to consist of secondary particles formed by aggregation of primary particles of $LiFePO_4$. In addition, a layer can be observed to be present on the outer periphery of each primary particle.

FIG. 8(*b*) is a micrograph obtained by HAADF of the area of the interface between primary particles of the positive electrode active material of the present disclosure and the sulfide solid electrolyte. In this micrograph, the lower right corner is the positive electrode active material, while the upper left corner is the sulfide solid electrolyte. In addition, in this micrograph, the portion surrounded by two dotted lines is the coating layer. As shown in this micrograph, the coating layer portion can be understood to have a structure that differs from both the positive electrode active material and the sulfide solid electrolyte.

Figure 9A:
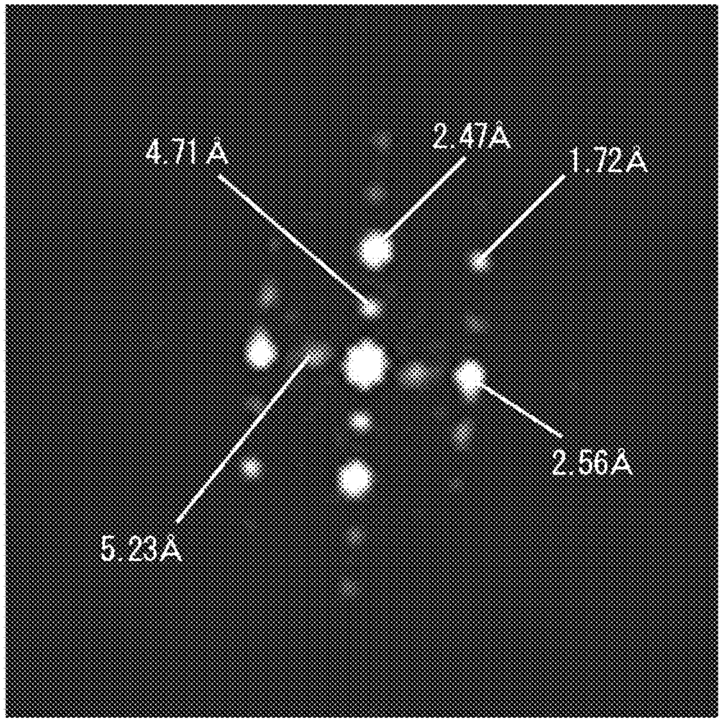
FIG. 9(*a*) is a diffraction image of the olivine-type positive electrode active material portion of the positive electrode active material according to one or more embodiments disclosed and described herein.
Figure 9B:
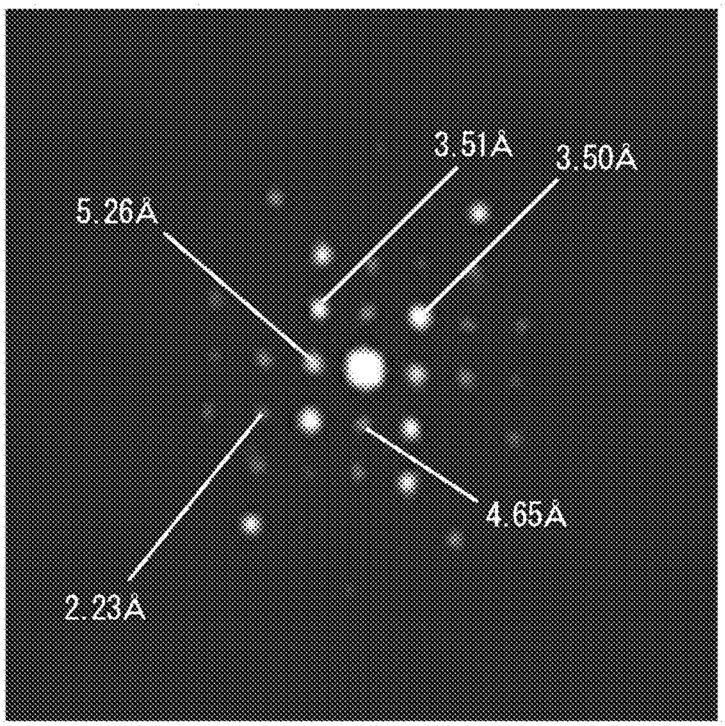

FIGS. 9(*a*) and 9(*b*) are images respectively representing diffraction associated with crystal structure for a portion of a layer having a different structure from the positive electrode active material and a portion of the positive electrode active material layer in FIG. 8(*b*). Since FIGS. 9(*a*) and 9(*b*) indicate respectively different diffraction patterns, these layers can be understood to have mutually different crystal structures.

Figure 10A:
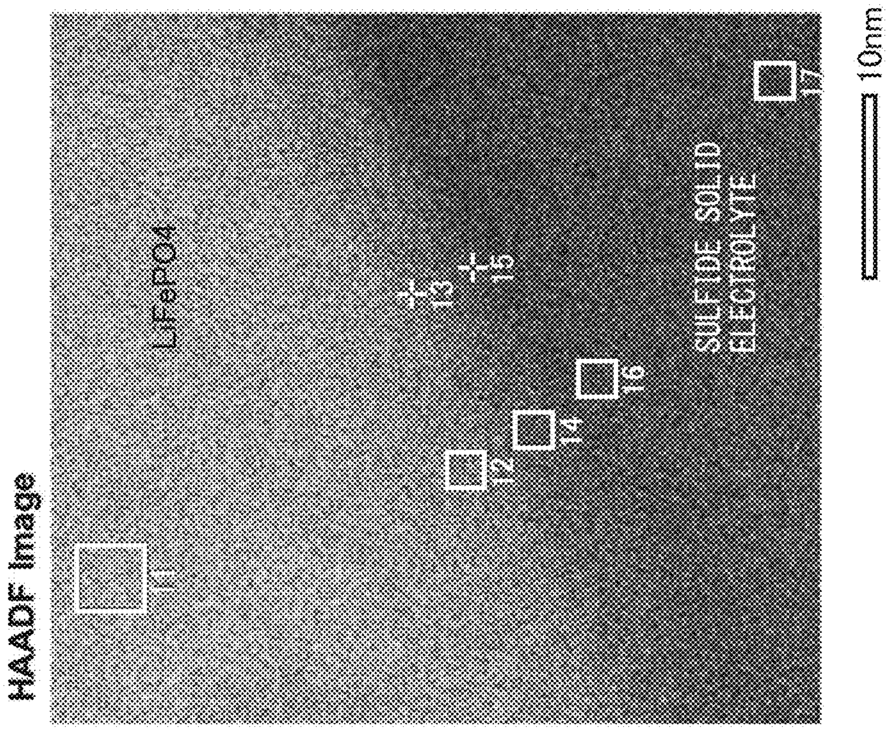
FIG. 10(*a*) is an HAADF image of the area around the interface between the positive electrode active material and sulfide solid electrolyte according to one or more embodiments disclosed and described herein.
Figure 10B:
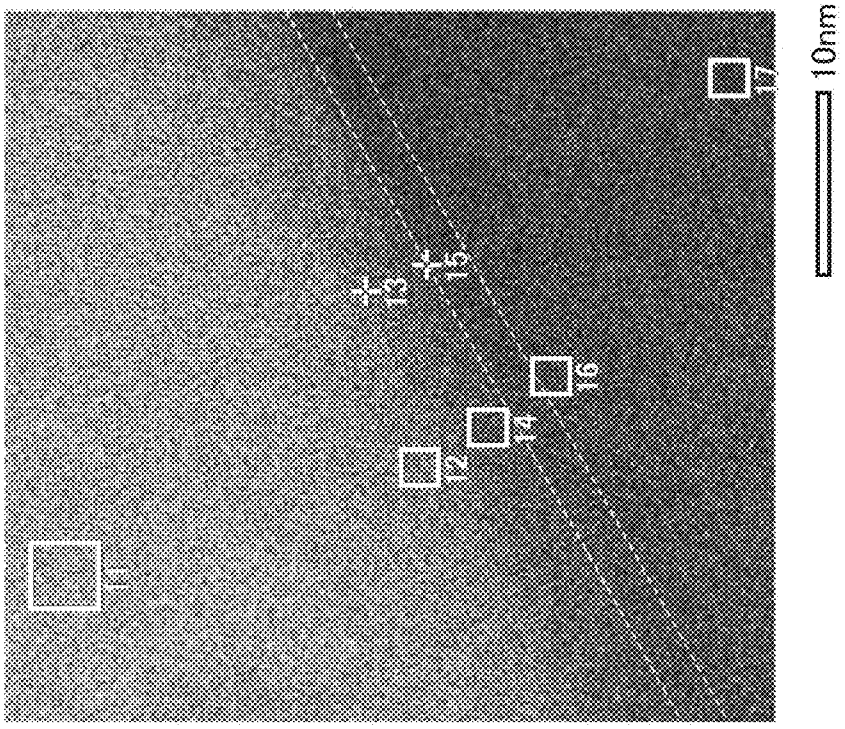

FIG. 10(*a*) is an HAADF image of a portion of the interface between primary particles of the positive electrode active material of the present disclosure and a sulfide solid electrolyte at a portion that differs from FIG. 8(*b*). In FIG. 10(*a*), the upper left corner of the image indicates the positive electrode active material, while the lower right corner indicates the sulfide solid electrolyte. According to FIG. 10(*a*), a coating layer and a transition metal-containing sulfide region can be observed to be present between the positive electrode active material and sulfide solid electrolyte.

FIG. 10(*b*) depicts dotted lines indicating the interface between the transition metal-containing sulfide region and coating layer and the interface between a transition-metal containing sulfide layer and sulfide solid electrolyte layer in order to further clarify the location of the transition metal-containing sulfide region. As shown in FIG. 10(*b*), the transition metal-containing sulfide region has a thickness of 10 nm or less.

Furthermore, the transition metal-containing sulfide region is also presumed to be present in this portion based on the detection of iron and sulfur in an interface portion (15) between the coating layer and transition metal-containing sulfide region and in a transition metal containing sulfide region (16) near the sulfide solid electrolyte.

In addition, Table 2 indicates the atomic percentages (at %) of oxygen, phosphorous, sulfur and iron atoms of an $LiFePO_4$ portion (11), an interface portion (12) between $LiFePO_4$ and the coating layer, a $LiFePO_4$ portion (13) on the side of the coating layer, a coating layer portion (14), an interface portion (15) between the coating layer and transition metal-containing sulfide region, a transition metal-containing sulfide region (16) near the sulfide solid electrolyte, and a sulfide solid electrolyte portion (17) in FIG. 10(*a*).

TABLE 2

| | at % | | | |
| --- | --- | --- | --- | --- |
| Location | Oxygen | Phosphorous | Sulfur | Iron |
| LiFePO4 portion (11) | 59.59 | 16.2 | 6.73 | 12.24 |
| Interface portion (12) between coating layer and LiFePO4 | 61.84 | 13.28 | 15.13 | 5.69 |
| LiFePO4 portion (13) on side of coating layer | 51.08 | 15.2 | 20.92 | 2.21 |
| Coating layer portion (14) | 49.65 | 15.0 | 24.45 | 0.78 |
| Interface portion (15) between coating layer and transition metal-containing sulfide region | 40.48 | 21.44 | 25.71 | 0.19 |
| Transition metal-containing sulfide region (16) near sulfide solid electrolyte | 17.97 | 16.92 | 56.69 | 1.25 |
| Sulfide solid electrolyte portion (17) | 15.07 | 20.26 | 57.55 | — |

Figure 11:
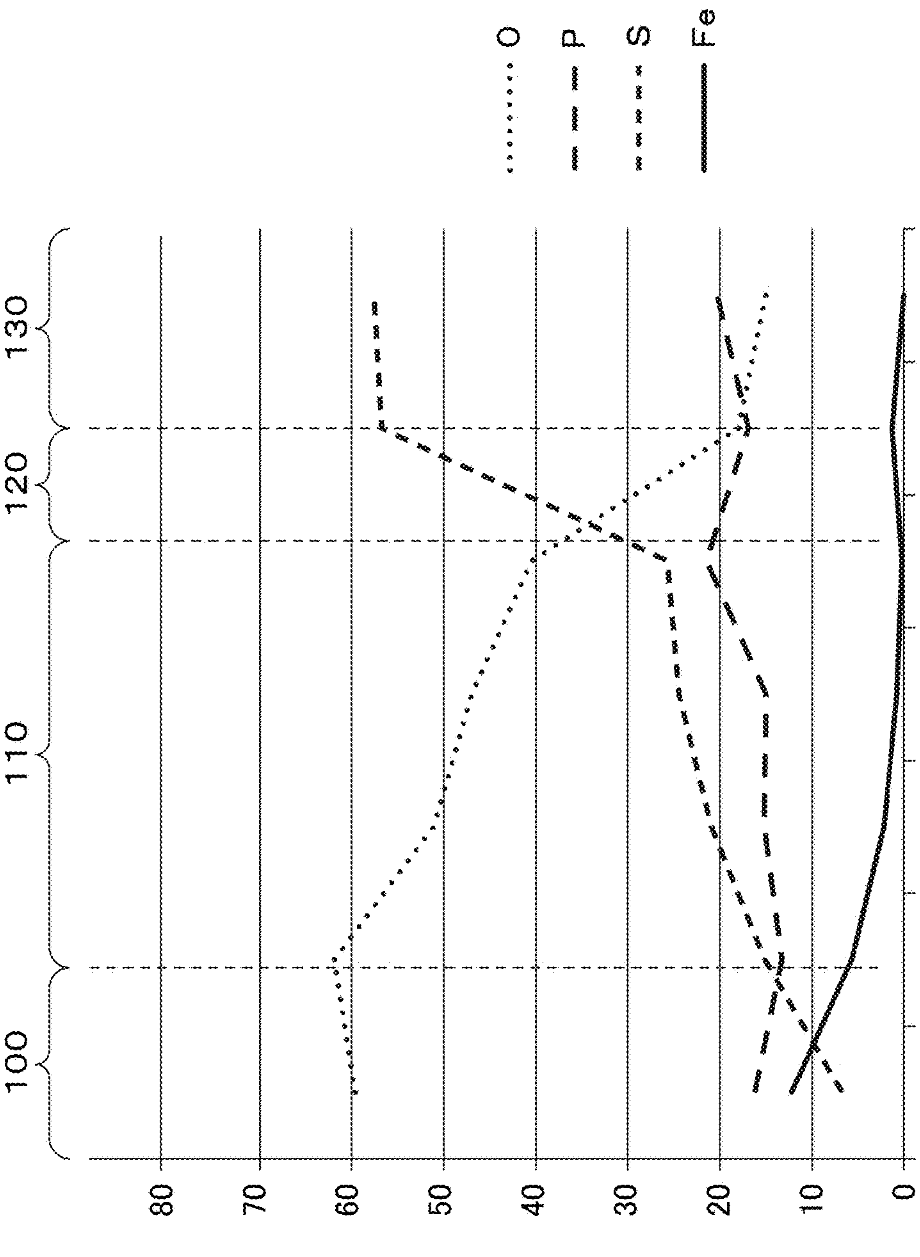
FIG. 11 is a graph representing the ratios of oxygen, phosphorous, sulfur and iron at each location of the HAADF image of FIG. 10.

In addition, FIG. 11 is a graph indicating the atomic percentages (at %) of oxygen, phosphorous, sulfur and iron atoms of the $LiFePO_4$ portion (11), the interface portion (12) between $LiFePO_4$ and the coating layer, the $LiFePO_4$ portion (13) on the side of the coating layer, the coating layer portion (14), the interface portion (15) between the coating layer and transition metal-containing sulfide region, the portion (16) of the transition metal-containing sulfide region near the sulfide solid electrolyte, and the sulfide solid electrolyte portion (17) in FIG. 10(*a*).

In this graph, the portion extending from the LiFePO4 portion (11) to the interface portion (12) between $LiFePO_4$ and the coating layer is an $LiFePO_4$ portion (100), the portion between the interface portion (12) between $LiFePO_4$ and the coating layer and the interface portion (15) between the coating layer and the transition metal-containing sulfide region is a coating layer portion (110), the portion between the interface portion (15) between the coating layer and the transition metal-containing sulfide region and the transition metal-containing sulfide region (16) near the sulfide solid electrolyte is a transition metal-containing sulfide region (120), and the portion extending from the portion (16) of the transition metal-containing sulfide region near the sulfide solid electrolyte to the sulfide solid electrolyte (17) is a sulfide solid electrolyte portion (130). Furthermore, the atomic percentages of these elements were measured according to the FIB method.

In FIG. 11, the atomic percentage (at %) of iron in the $LiFePO_4$ portion (11) is 12.2 at %. In contrast, atomic percentage of iron atoms in the interface portion (12) between $LiFePO_4$ and the coating layer decreased to 5.7 at %. Moreover, the atomic percentage of iron in the $LiFePO_4$ portion (13) on the side of the coating layer and the coating layer portion (14) decreased moving towards the side of the transition metal-containing sulfide region, and the atomic percentage of iron in the interface portion (15) between the coating layer and the transition metal-containing sulfide region was 0.19 at %. However, the atomic percentage of iron increased to 1.25 at % in portion (16) of the transition metal-containing sulfide region near the sulfide solid electrolyte. The atomic percentage of iron was unable to be measured in the sulfide solid electrolyte portion (17).

In addition, in contrast to the atomic percentage of oxygen being roughly 60 at % in the $LiFePO_4$ portion (11) and the interface portion (12) between $LiFePO_4$ and the coating layer, it decreased to 40 at % to 50 at % in the coating layer (110) and further decreased to 20 at % or less in the transition metal-containing sulfide region (120).

In addition, in contrast to the atomic percentage of sulfur being 6.73 at % in the $LiFePO_4$ portion (11), it increased to 15.13 at % in the interface portion (12) between $LiFePO_4$ and the coating layer, and was 20 at % or more in the coating layer portion (110). The atomic percentage of sulfur in the transition metal-containing sulfide region (120) was 50 at % or more. Furthermore, sulfur detected in the $LiFePO_4$ portion (11) and coating layer portion (110) is thought to be sulfur present in the sulfide solid electrolyte present on the back of $LiFePO_4$ particles.

Furthermore, the atomic percentage of phosphorous was nearly constant from the positive electrode active material layer to the sulfide solid electrolyte.

On the basis of these findings, the coating layer of the positive electrode active material of the present disclosure can be said to contain phosphorous, oxygen, sulfur and iron, and have a lower concentration of iron than $LiFePO_4$. In addition, on the basis of these results, production conditions of the present example can be said to consist of a molar ratio of oxygen to phosphorous of 1.89 to 4.66, a molar ratio of sulfur to oxygen of 0.24 to 0.64, and a molar ratio of iron to phosphorous of 0.01 to 0.43 in the coating layer. Furthermore, the following Table 3 indicates the molar ratio of iron to phosphorous, the molar ratio of oxygen to phosphorous and the molar ratio of sulfur to oxygen in each portion.

TABLE 3

| Location | Fe/P | O/P | S/O |
| --- | --- | --- | --- |
| $LiFePO_4$ portion (11) | 0.76 | 3.68 | 0.11 |
| Interface portion (12) between $LiFePO_4$ and coating layer | 0.43 | 4.66 | 0.24 |
| $LiFePO_4$ portion (13) on side of coating layer | 0.15 | 3.37 | 0.41 |
| Coating layer portion (14) | 0.05 | 3.31 | 0.49 |
| Interface portion (15) between coating layer and transition metal-containing sulfide region | 0.01 | 1.89 | 0.64 |
| Portion (16) of transition metal-containing sulfide region near sulfide solid electrolyte | 0.07 | 1.06 | 3.15 |
| Sulfide solid electrolyte portion (17) | — | 0.74 | 3.82 |

Furthermore, in Table 3, Fe/P is the molar ratio of iron to phosphorous, O/P is the molar ratio of oxygen to phosphorous, and S/O is the molar ratio of sulfur to oxygen.

Comparative Example 1

A sulfide all-solid-state battery having $LiFePO_4$ for the positive electrode active material was fabricated and charged and discharged using a method of the prior art. Following completion of charging and discharging, the area around the positive electrode active material of this all-solid-state battery was observed with a scanning electron microscope.

Figure 12A:
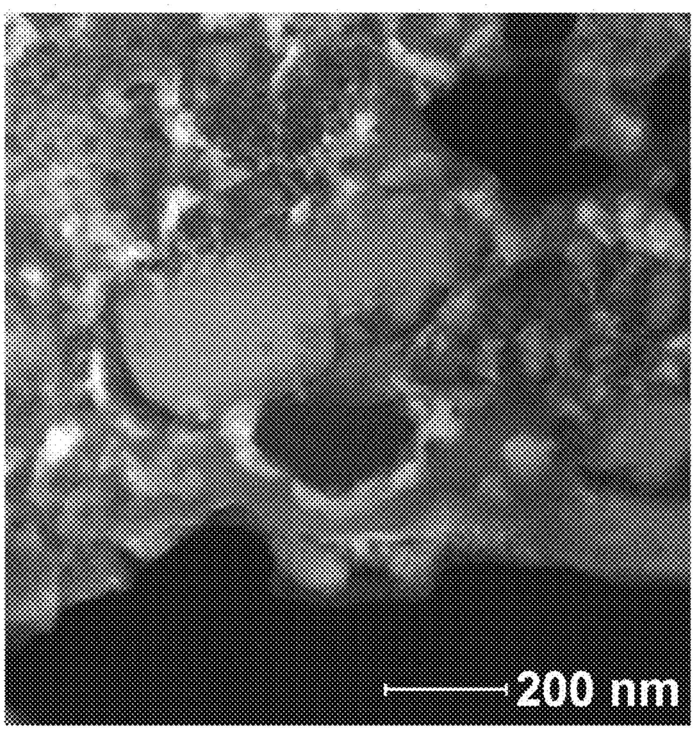
FIG. 12(*a*) is a TEM image of a positive electrode active material of an all-solid-state battery having an olivine-type positive electrode active material and a sulfide solid electrolyte which has been charged by a conventional method.
Figure 12B:
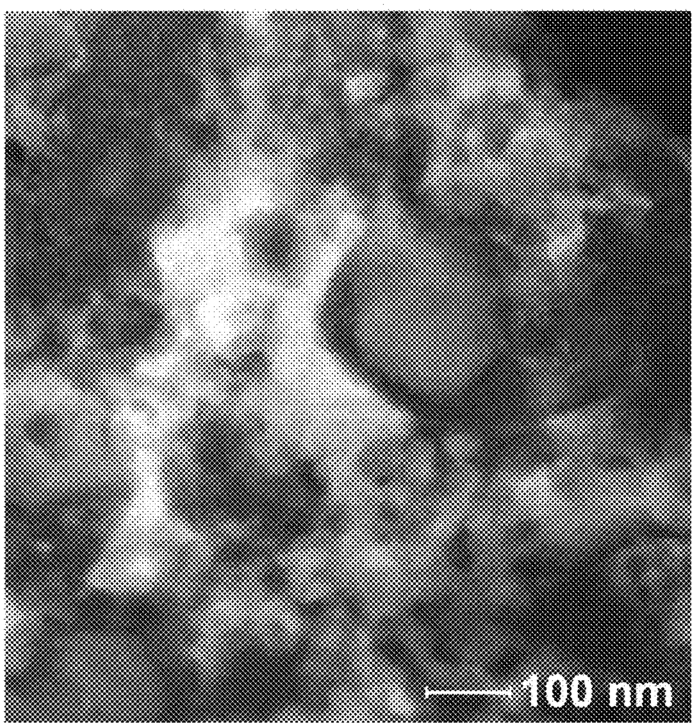

FIGS. 12(*a*) and 12(*b*) are each micrographs obtained by transmission electron microscopy (TEM) of the sulfide all-solid-state battery of Comparative Example 1. In the micrographs, white portions covering the surface of positive electrode active material particles indicate a resistive layer. As shown in these micrographs, the thickness of the resistive layer was several tens of nanometers in the sulfide all-solid-state battery of Comparative Example 1.

<<Comparison Between all-Solid-State Battery of Present Disclosure and Other Batteries>>

Battery capacities were compared between an all-solid-state battery of the present disclosure (Example 18), an all-solid-state battery using a sulfide solid electrolyte and $LiFePO_4$ for the positive electrode active material, but not having a coating layer (Reference Example 3), and an all-solid-state battery using a sulfide solid electrolyte and $LiFePO_4$ having a coating layer consisting of $Li_3PO_4$ (Reference Example 4). Furthermore, the all-solid-state batteries of Example 18 and Reference Examples 3 and 4 were fabricated in the manner described below.

<Fabrication of all-Solid-State Batteries>

The all-solid-state battery of Example 18 was fabricated according to the method described in the section entitled "<Fabrication of All-solid-state Batteries>" of the aforementioned section entitled "<<Verification of Charge-Discharge Cycle Conditions-1>>", followed by repeating 20 cycles of charging and discharging at a temperature of 60° C., charge-discharge rate of 0.1 C, upper limit charging potential of 4.1 V (vs. $Li/Li^+$) and lower limit discharge potential of 1.6 V (vs. $Li/Li^+$) to complete the all-solid-state battery.

The all-solid-state battery of Reference Example 3 was fabricated according to the method described in the section entitled "<Fabrication of All-solid-state Batteries>" of the aforementioned section entitled "<<Verification of Charge-Discharge Cycle Conditions-1>>", followed by charging and discharging without lowering the discharge potential to 2.1 V or less.

The all-solid-state battery of Reference Example 4 was fabricated according to the method described in the section entitled "<Fabrication of All-solid-state Batteries>" of the aforementioned section entitled "<<Verification of Charge-Discharge Cycle Conditions-1>>" with the exception of using $LiFePO_4$ having an $Li_3PO_4$ coating for the positive electrode active material, followed by fabricating according to the method described in the section entitled "<<Verification of Charge-Discharge Cycle Conditions-1>>". Furthermore, the $LiFePO_4$ having an $Li_3PO_4$ coating was fabricated according to the method described below.

First, $LiFePO_4$, $Li_3PO_4$ and ascorbic acid were mixed in 170 ml of pure water that had been deoxygenated by bubbling with $N_2$ gas to prepare a mixed aqueous solution. Next, this mixed aqueous solution was placed in an autoclave and the pH was adjusted to 10 using ammonium hydroxide. Subsequently, the mixed aqueous solution was held for 1 hour under conditions of heating with water at 150° C. followed by going through filtration and drying steps and then subjecting to heat treatment for 1 hour at 700° C. in the presence of a 3% $H_2/Ar$ atmosphere to obtain a positive electrode active material having a coating layer composed of $Li_3PO_4$ coated on the surface of $LiFePO_4$. Refer to Patent Document 1 for further details regarding the fabrication method.

<Comparison of Battery Capacity>

The all-solid-state batteries of Example 18 and Reference Example 4 were charged and discharged at an upper limit charging potential of 4.1 V (vs. $Li/Li^+$), lower limit discharge potential of 1.6 V (vs. $Li/Li^+$) and charge-discharge rate of 0.1 C for 10 cycles in Example 18 and 3 cycles in Reference Example 4. In addition, the all-solid-state battery of Reference Example 3 was charged and discharged for 4 cycles at an upper limit charge potential of 4.1 V (vs. $Li/Li^+$), lower limit discharge potential of 2.3 V (vs. $Li/Li^+$) and charge-discharge rate of 0.1 C. Subsequently, a comparison was made of the battery capacities of these all-solid-state batteries.

FIG. 3 is a graph representing the relationship between voltage and battery capacity during charge-discharge cycling of the all-solid-state battery of Reference Example 3, FIG. 4 is a graph of the same for the all-solid-state battery of Reference Example 4, and FIG. 5 is a graph of the same for the all-solid-state battery of Example 18.

As shown in FIG. 3, in the all-solid-state battery of Reference Example 3, battery capacity decreased each time charging and discharging were repeated. In addition, as shown in FIG. 4, in the all-solid-state battery of Reference Example 4, battery capacity did not decrease even after repeating charge-discharge cycling for at least 3 cycles, while on the contrary, battery capacity increased from less than 100 mAh/g to 110 mAh/g. However, a reaction plateau occurred at 2.2 V (vs. $Li/Li^+$) to 3.0 V (vs. $Li/Li^+$) during discharge each time cycling was repeated. This indicates that the $Li_3PO_4$ coating of the positive electrode active material was destroyed as a result of charging and discharging, and that $LiFePO_4$ and sulfide solid electrolyte reacted at that portion resulting in the formation of a resistive layer.

In contrast, in the all-solid-state battery of Example 18 as shown in FIG. 5, battery capacity remained unchanged at the value of the theoretical capacity of $LiFePO_4$ of 170 mAh/g even after subjecting to charge-discharge cycling for a larger number of cycles than that used for the all-solid-state batteries of Reference Examples 3 and 4, and a potential plateau was present at the reaction potential of $LiFePO_4$, namely 3.3 V (vs. $Li/Li^+$) to 3.5 V (vs. $Li/Li^+$).

<<Internal Resistance and Cycling Characteristics of All-Solid-State Battery of Present Disclosure>>

An all-solid-state battery was fabricated according to the method described in the aforementioned section entitled "<<Verification of Charge-Discharge Cycle Conditions-1>>" for use in Example 19, followed by repeating charging and discharging for 20 cycles at a temperature of 60° C., charge discharge rate of 0.1 C, upper limit charging potential of 4.1 V (vs. $Li/Li^+$), and lower limit discharge potential of 1.6 V (vs. $Li/Li^+$) to complete the all-solid-state battery.

Subsequently, charge-discharge cycling was repeated at a temperature of 25° C., charge-discharge rate of 1 C, upper limit charging potential of 4.1 V (vs. $Li/Li^+$) and lower limit discharge potential of 2.6 V (vs. $Li/Li^+$) followed by measuring changes in internal resistance and changes in battery capacity of the all-solid-state battery of Example 19.

Figure 13:
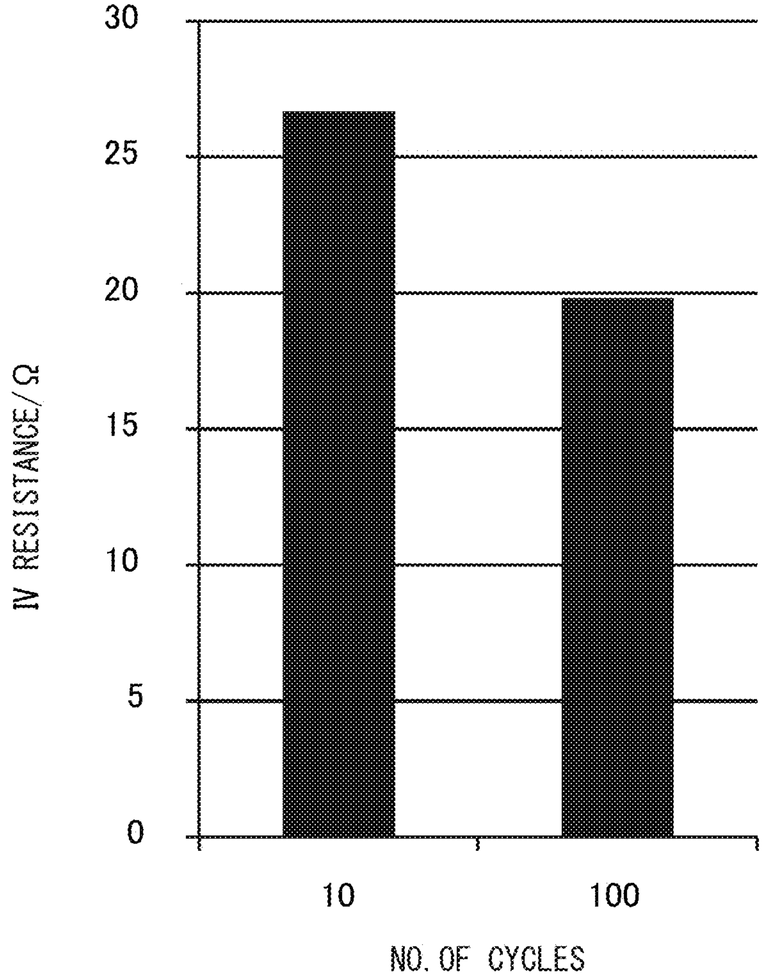
FIG. 13 is a graph representing the relationship between charge-discharge cycle and internal resistance of the all-solid-state battery according to one or more embodiments disclosed and described herein.

FIG. 13 is a bar graph representing the relationship between the number of charge-discharge cycles and internal resistance of the all-solid-state battery of Example 19. As shown in the graph, in contrast to internal resistance after repeating charge-discharge cycling 10 times being about 27Ω, internal resistance after repeating charge-discharge cycling 100 times decreased to about 20Ω.

Figure 14:
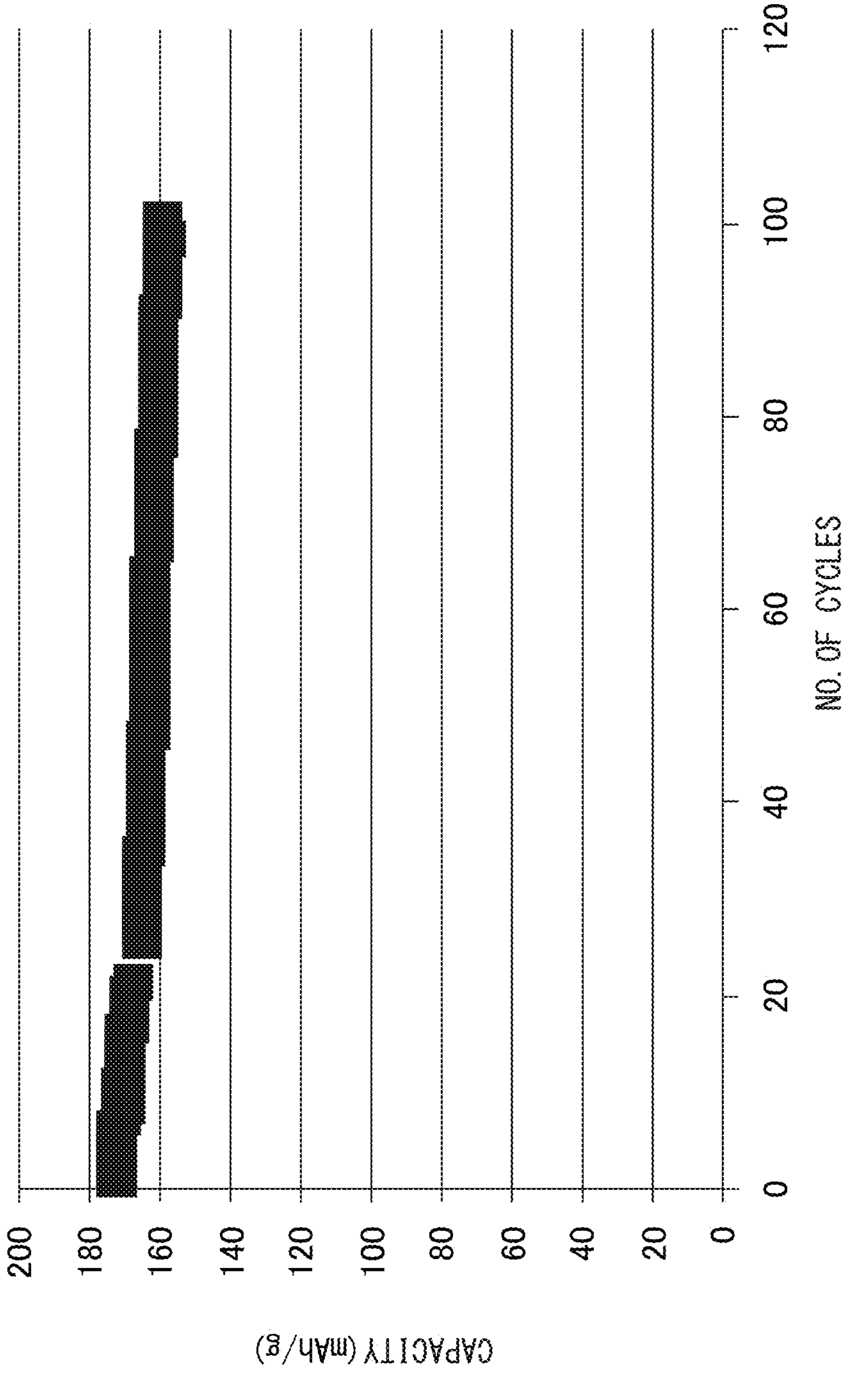
FIG. 14 is a graph representing the cycling characteristics of the all-solid-state battery according to one or more embodiments disclosed and described herein.

FIG. 14 is a graph representing the relationship between the number of charge-discharge cycles and battery capacity of the all-solid-state battery of Example 19. As shown in the graph, battery capacity prior to carrying out charge-discharge cycling was about 175 mAh/g and battery capacity after 100 cycles was about 160 mAh/g, representing battery capacity equal to more than 90% of that prior to carrying out charge-discharge cycling. Thus, although battery capacity decreased as a result of repeating charge-discharge cycling, the all-solid-state battery of Example 19 can be said to have high cycling characteristics.

BRIEF DESCRIPTION OF THE REFERENCE SYMBOLS

1 Olivine-type positive electrode active material
2 Coating layer
3 Carbon coating layer
4 Transition metal-containing sulfide region
5 Resistive layer
6 Sulfide solid electrolyte
10 Primary particle of positive electrode active material of present disclosure
100 $LiFePO_4$ portion
110 Coating layer portion 120 Transition metal-containing sulfide region
130 Sulfide solid electrolyte portion

The invention claimed is:

1. A positive electrode active material comprising:
primary particles; wherein,
the primary particles aggregate into secondary particles;
the primary particles have an olivine-type positive electrode active material and a coating layer that coats all or a portion of the olivine-type positive electrode active material, the olivine-type positive electrode active material is represented by the chemical formula $Li_xM_xPO_z$ wherein, M is a transition metal selected from Fe, Mn, Co, Ni, or combinations of these transition metals, x is such that $0.5 \leq x \leq 1.5$, y is such that $0.5 \leq y \leq 1.5$, and z is such that $2 \leq z \leq 7$,
the coating layer contains as components thereof the transition metal derived from the olivine-type positive electrode active material, lithium, phosphorous and oxygen, and a concentration of the transition metal in the coating layer is less than a concentration of the transition metal in the olivine-type positive electrode active material, and
a transition metal-containing sulfide region having a thickness of 10 nm or less is present on a surface of the secondary particles, the transition metal-containing sulfide region having sulfur and the transition metal derived from the olivine-type positive electrode active material.

2. The positive electrode active material according to claim 1, wherein the primary particles comprise at least one carbon coating layer, wherein the at least one carbon coating layer coats the coating layer or is disposed between the olivine-type positive electrode active material and the coating layer.

3. The positive electrode active material according to claim 1, wherein the thickness of the coating layer is less than 50 nm.

4. The positive electrode active material according to claim 1, wherein a molar ratio of oxygen to phosphorous in the coating layer is 1.89 to 4.66, a molar ratio of sulfur to oxygen is 0.24 to 0.64, and a molar ratio of the transition metal to phosphorous is 0.01 to 0.43.

5. The positive electrode active material according to claim 1, wherein the coating layer comprises $Li_4P_2O_7$.

6. The positive electrode active material according to claim 1, wherein the transition metal-containing sulfide region coats all or a portion of the primary particles.

7. The positive electrode active material according to claim 1, wherein the transition metal-containing sulfide region comprises at least one of iron sulfide and lithium sulfide.

8. The positive electrode active material according to claim 1, wherein the olivine-type positive electrode active material is $LiFePO_4$.

9. An all-solid-state battery having a sulfide solid electrolyte and the positive electrode active material according to claim 1.

10. The positive electrode active material according to claim 1, wherein a molar ratio of oxygen to phosphorous in the coating layer is 1.89 to 4.00.

* * * * *

UNITED STATES PATENT AND TRADEMARK OFFICE

CERTIFICATE OF CORRECTION

PATENT NO. : 10,361,427 B2
APPLICATION NO. : 15/267556
DATED : July 23, 2019
INVENTOR(S) : Mayuko Osaki et al.

It is certified that error appears in the above-identified patent and that said Letters Patent is hereby corrected as shown below:

In the Specification

In Column 17, Line 24, delete "4.1 v" and insert --4.1 V--, therefor.

In the Claims

In Column 31, Claim 1, Line 12, delete "$Li_xM_xPO_z$" and insert --$Li_xM_YPO_z$--, therefor.

Signed and Sealed this
Tenth Day of September, 2019

Andrei Iancu
*Director of the United States Patent and Trademark Office*